(12) United States Patent
James

(10) Patent No.: US 11,318,658 B2
(45) Date of Patent: May 3, 2022

(54) MOLD ASSEMBLY WITH REMOVABLE MOLD TOOL, BLADDER FOR A WEARABLE ARTICLE, AND METHOD OF MANUFACTURING THE BLADDER

(71) Applicant: NIKE, Inc., Beaverton, OR (US)

(72) Inventor: Dervin A. James, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 5 days.

(21) Appl. No.: 16/943,255

(22) Filed: Jul. 30, 2020

(65) Prior Publication Data

US 2021/0086434 A1 Mar. 25, 2021

Related U.S. Application Data

(60) Provisional application No. 62/902,509, filed on Sep. 19, 2019.

(51) Int. Cl.
| | |
|---|---|
| *B29C 51/00* | (2006.01) |
| *B29C 51/10* | (2006.01) |
| *B29C 51/20* | (2006.01) |
| *B29C 51/30* | (2006.01) |
| *B29K 23/00* | (2006.01) |
| *B29K 75/00* | (2006.01) |
| *B29K 101/12* | (2006.01) |
| *B29L 31/50* | (2006.01) |

(52) U.S. Cl.
CPC .......... *B29C 51/006* (2013.01); *B29C 51/10* (2013.01); *B29C 51/20* (2013.01); *B29C 51/30* (2013.01); *B29K 2023/086* (2013.01); *B29K 2075/00* (2013.01); *B29K 2101/12* (2013.01); *B29L 2031/50* (2013.01)

(58) Field of Classification Search
None
See application file for complete search history.

(56) References Cited

U.S. PATENT DOCUMENTS

| 3,474,498 A | 10/1969 | Hoppes |
| 4,183,156 A | 1/1980 | Rudy |
| 4,219,945 A | 9/1980 | Rudy |
| (Continued) | | |

FOREIGN PATENT DOCUMENTS

| EP | 3429395 A1 | 1/2019 |
| TW | 200934403 A | 8/2009 |
| TW | 201831307 A | 9/2018 |

*Primary Examiner* — Monica A Huson
(74) *Attorney, Agent, or Firm* — Quinn IP Law

(57) ABSTRACT

A method of manufacturing a wearable article may include providing a modular mold assembly that defines a mold cavity. The modular mold assembly may include a base and a first removable mold tool that interfits with the base. The base may have a mold surface partially defining the mold cavity and the first removable mold tool may have a mold surface disposed at and further defining the mold cavity of the modular mold assembly. A topography of the mold surface of the first removable mold tool may be nonuniform and different than a topography of the mold surface of the base. The method may include disposing polymeric material at the mold cavity, and then thermoforming a bladder in the mold cavity from the polymeric material. The bladder may have an outer surface with a nonuniform topography imparted by the topography of the mold surface of the first removable mold tool.

20 Claims, 15 Drawing Sheets

(56) References Cited

U.S. PATENT DOCUMENTS

| | | | |
|---|---|---|---|
| 4,379,687 A * | 4/1983 | Wilson | B29C 33/306 |
| | | | 249/103 |
| 4,936,029 A | 6/1990 | Rudy | |
| 5,042,176 A | 8/1991 | Rudy | |
| 5,411,699 A | 5/1995 | Collette et al. | |
| 5,736,168 A | 4/1998 | Goyal et al. | |
| 6,013,340 A | 1/2000 | Bonk et al. | |
| 6,082,025 A | 7/2000 | Bonk et al. | |
| 6,127,026 A | 10/2000 | Bonk et al. | |
| 6,203,868 B1 | 3/2001 | Bonk et al. | |
| 6,321,465 B1 | 11/2001 | Bonk et al. | |
| 9,827,727 B2 | 11/2017 | Villeneuve et al. | |
| 9,974,360 B2 | 5/2018 | Hensley et al. | |
| 2005/0039347 A1 | 2/2005 | Meschan | |
| 2006/0110487 A1 * | 5/2006 | Bergmann | B29C 33/306 |
| | | | 425/119 |
| 2007/0193068 A1 | 8/2007 | Calvano et al. | |
| 2017/0036940 A1 | 2/2017 | Sharp et al. | |
| 2018/0332924 A1 | 11/2018 | Bailey et al. | |

* cited by examiner

MOLD ASSEMBLY WITH REMOVABLE MOLD TOOL, BLADDER FOR A WEARABLE ARTICLE, AND METHOD OF MANUFACTURING THE BLADDER

CROSS-REFERENCE TO RELATED APPLICATIONS

This application claims the benefit of priority to U.S. Provisional Application No. 62/902,509 filed Sep. 19, 2019, which is hereby incorporated by reference in its entirety.

TECHNICAL FIELD

The present disclosure generally relates to a mold assembly with a removable mold tool, a method of manufacturing a bladder for a wearable article, and to a wearable article including the bladder.

BACKGROUND

Wearable articles may include structure configured to cushion the wearer and may often be a source of expression for the wearer. For example, clothing and/or footwear may provide an association with a team, coordinate with another item, or provide the owner or user with an attractive or customized item.

An article of footwear typically includes a sole structure configured to be located under a wearer's foot to space the foot away from the ground. Sole structures in athletic footwear are typically configured to provide cushioning, motion control, and/or resiliency.

BRIEF DESCRIPTION OF THE DRAWINGS

The drawings described herein are for illustrative purposes only, are schematic in nature, and are intended to be exemplary rather than to limit the scope of the disclosure.

DESCRIPTION

Figure 1:
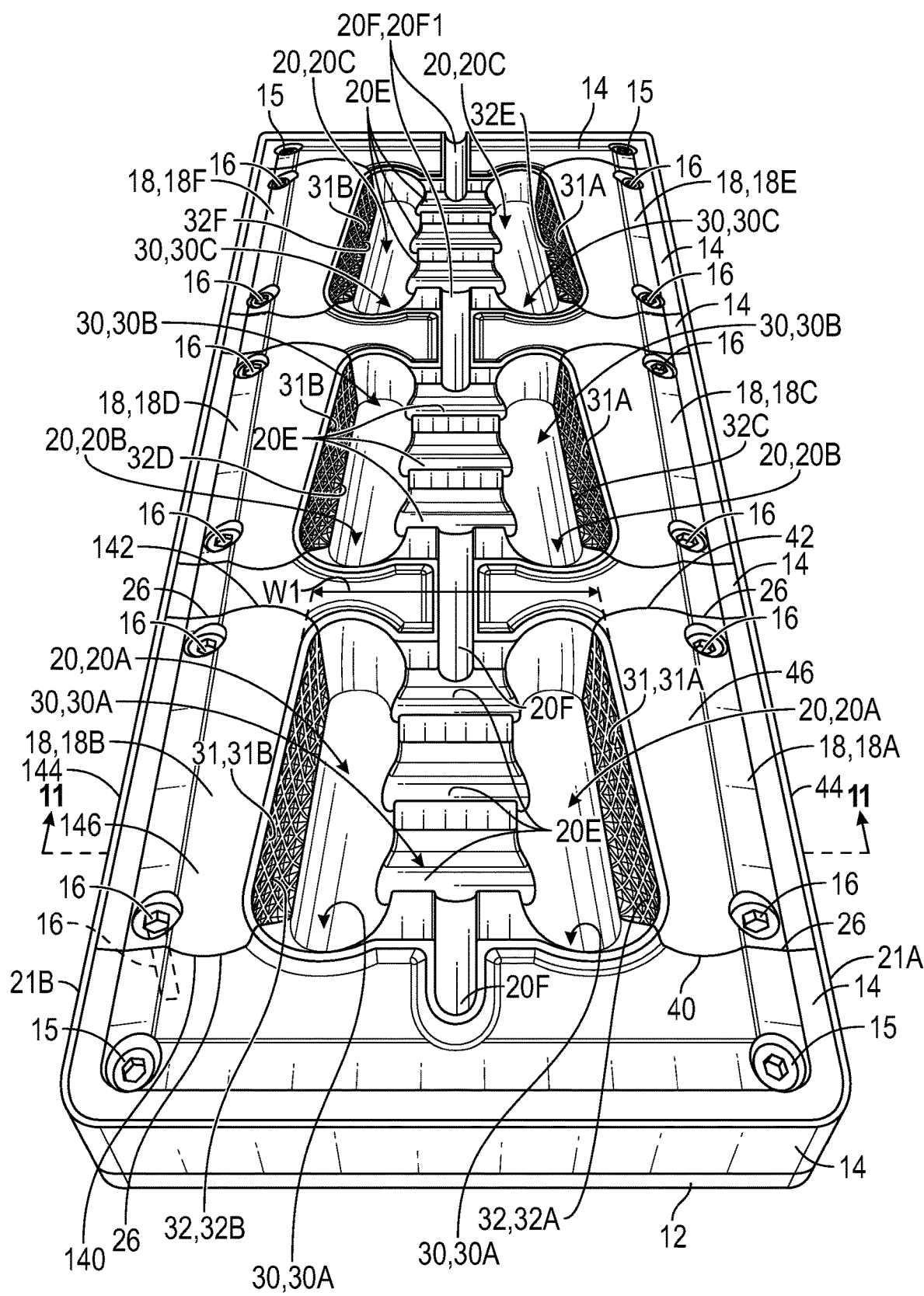
FIG. 1 is a perspective view of a modular mold assembly including different removable mold tools.

Some sole structures include sealed, fluid-filled bladders. Mold assemblies are often used to form the bladders. A traditional mold assembly is capable of forming only one size bladder and may not be configured to provide different bladders with different characteristics. It can be expensive and time consuming to manufacture bladders with different configurations or characteristics, as each such bladder may require a different mold assembly. The present disclosure generally relates to a modular mold assembly, a wearable article that includes a bladder having a nonuniform topography, a method of manufacturing the wearable article with the bladder that has the nonuniform topography using removable mold tools in the modular mold assembly to avoid the need for a completely different mold assembly to achieve bladders with different configurations or characteristics.

As used herein, for the purposes of this application and its claims, a "wearable article" is an article that is configured to be worn on a human body and does not include durable goods not intended to be worn on a human body, such as furniture and automotive upholstery. Non-limiting examples of wearable articles include footwear, apparel, sporting equipment such as shin guards and baseball mitts, carry bags such as backpacks, purses, duffel bags, fanny packs, and other types of portable containment structures intended to be worn on a human body.

In an example, a modular mold assembly comprises a base having a mold surface that partially defines a mold cavity for thermoforming a polymeric bladder with a fluid-filled chamber. The base includes a side wall defining a first opening that opens into the mold cavity. The modular mold assembly further comprises a first removable mold tool that has an inner wall with a mold surface having a topography different than a topography of the mold surface of the base. The first removable mold tool fits in the first opening in the side wall of the base with less than a predetermined clearance and with the mold surface of the first removable mold tool adjacent to the mold surface of the base and further defining the mold cavity. The first removable mold tool includes an outer wall opposite from the inner wall, a front wall, a rear wall opposite from the front wall, a top wall, and a bottom wall opposite from the top wall. Each of the front wall, the rear wall, the top wall, and the bottom wall extends from the outer wall to the mold surface. The rear wall is wider than the front wall and the bottom wall is wider than the top wall. A removable mold tool with such dimensions and shape provides several advantages. First, the first removable mold tool may be wedged into the first opening in a direction toward the mold cavity, easily providing a correct alignment of the mold surface of the first removable mold tool with the mold surface of the base. Additionally, the first removable mold tool fits into the first opening in only one orientation. The base may have a second opening opposite from the first opening and configured as a mirror image of the first opening. Due to its dimensions and shape, the first removable mold tool will not fit into the second opening, preventing inadvertent misplacement of the first removable mold tool during manufacturing. Additionally, due to its dimensions and shape, the first removable mold tool will not fit into the first opening if placed upside down or backward.

In an example, the first removable mold tool may define channels extending through the first removable mold tool to the mold surface of the first removable mold tool. Additionally, the base may define at least one conduit in fluid communication with the channels of the first removable mold tool. The channels allow a vacuum to be applied, pulling polymeric material used to form the bladder against the mold surface to provide a more exact imparting of the nonuniform topography of the mold surface onto the polymeric material.

In one or more embodiments, the front wall may have a surface area less than a surface area of the rear wall. The top wall may have a surface area less than a surface area of the bottom wall. For example, a projected surface area of the top wall projected onto a plane extending through the first removable mold tool between the top wall and the bottom wall may be less than a projected surface area of the bottom wall projected onto the plane. Similarly, a projected surface area of the front wall projected onto a plane extending through the first removable mold tool between the front wall and the rear wall may be less than a projected surface area of the rear wall projected onto the plane. Stated differently, the footprint of the top wall may be less than that of the bottom wall, and the footprint of the front wall may be less than that of the rear wall.

In an example, the mold surface of the first removable mold tool may be concave in a direction from the front wall to the rear wall and concave in a direction from the top wall to the bottom wall. A portion of the bladder formed by the first removable mold tool may thus be convex along its height and along its length, for example.

In one or more embodiments, at least one of the front wall or the rear wall is non-planar. For example, at least a portion of the front wall may be convex and at least a portion of the rear wall may be convex. This allows the first removable mold tool to be wedged into the first opening in a direction toward the mold cavity, easily providing a correct alignment of the mold surface of the first removable mold tool with the mold surface of the base. A length of the outer wall may be greater than a length of the inner wall, further contributing to the ability to wedge the first removable mold tool into the first opening to align the mold surface of the first removable mold tool with the mold surface of the base. When properly aligned with the first removable mold tool in the first opening of the side wall of the base, the outer wall of the first removable mold tool may be flush with the side wall of the base.

The modular mold assembly may be configured with two removable mold tools for imparting a nonuniform topography to two different portions of a wearable article such as to two side walls of a bladder thermoformed in the modular mold assembly. For example, the side wall of the base may be a first side wall and the base may further include a second side wall opposite from the first side wall. The second side wall may define a second opening that opens into the mold cavity. The modular mold assembly may further comprise a second removable mold tool that has an inner wall with a mold surface having a topography different than a topography of the mold surface of the base. The second removable mold tool may fit lengthwise in the second opening with the mold surface of the second removable mold tool adjacent to the mold surface of the base and further defining the mold cavity. The second removable mold tool may include an outer wall opposite from the inner wall, a front wall, a rear wall opposite from the front wall, a top wall, and a bottom wall opposite from the top wall. Each of the front wall, the rear wall, the top wall, and the bottom wall of the second removable mold tool may extend from the outer wall to the mold surface, with the rear wall of the second removable mold tool wider than the front wall of the second removable mold tool and the bottom wall of the second removable mold tool wider than the top wall of the second removable mold tool.

In one or more embodiments, the top wall, the bottom wall, the front wall, and the rear wall of the second removable mold tool may be mirror images in shape and dimension of the top wall, the bottom wall, the front wall, and the rear wall, respectively, of the first removable mold tool. The mold surfaces of the removable mold tools may be but need not be the same as each mold tool is separately inserted and removed from the base. For example, the mold surface of the second removable mold tool may have a nonuniform topography different from the nonuniform topography of the first removable mold tool. The mold surface of the first removable mold tool may impart a nonuniform topography to a first outer side wall of a bladder thermoformed in the modular mold assembly, and the mold surface of the second removable mold tool may impart a nonuniform topography to a second outer side wall of the bladder. For example, the nonuniform topologies may be at outer side walls at the medial and lateral side, respectively, of a bladder for an article of footwear.

In an example, a method of manufacturing a wearable article may include providing a modular mold assembly that defines a mold cavity. The modular mold assembly may include a base and a first removable mold tool that interfits with the base. The base may have a mold surface partially defining the mold cavity and the first removable mold tool may have a mold surface disposed at and further defining the mold cavity of the modular mold assembly. A topography of the mold surface of the first removable mold tool may be nonuniform and different than a topography of the mold surface of the base. The method may include disposing polymeric material at the mold cavity, and then thermoforming a bladder in the mold cavity from the polymeric material. The bladder may have an outer surface with a nonuniform topography imparted by the topography of the mold surface of the first removable mold tool.

As used herein, a nonuniform topography may be a topography that includes depressions and protrusions, may include more than one inflection point, and may include both inflection points that are at depressions and inflection points that are at protrusions. Accordingly, a nonuniform topography may have a repeating pattern of depressions and protrusions, such as ribs, pyramidical, or other protrusions (e.g., a uniform pattern), or may not have a discernable pattern (e.g., may be a random, nonrepeating nonuniform topography).

In one example, the polymeric material may include a first polymeric sheet and a second polymeric sheet that may be joined together at a peripheral flange during thermoforming in the modular mold assembly, defining an interior cavity capable of retaining a fluid. For example, when the bladder is sealed, ambient or pressurized fluid may be retained in the interior cavity.

In one aspect, the method may include removing the removable mold tool from the modular mold assembly and inserting a second removable mold tool into the modular mold assembly. The second removable mold tool may include a different mold surface disposed at and partially defining the mold cavity of the modular mold assembly. A topography of the mold surface of the second removable mold tool may be different than the topography of the mold surface of the first removable mold tool so that a bladder with a different nonuniform topography can be thermoformed in the mold assembly. The production of bladders with different nonuniform topographies can be accomplished more quickly and with less expense than with traditional (nonmodular) mold assemblies, as only new removable mold tools rather than an entirely different mold assembly need be provided to achieve a different nonuniform topology.

For example, after manufacturing the bladder using the first removable mold tool, removing the bladder from the modular mold assembly, removing the first removable mold tool and inserting the second removable mold tool, the method may include disposing additional polymeric material at the mold cavity, and thermoforming the additional polymeric material in the mold cavity into a different bladder having a wall with an outer surface with a nonuniform topography imparted by the topography of the mold surface of the second removable mold tool and configured differently than the nonuniform topography of the bladder thermoformed using the first removable mold tool.

In a further aspect, the method may include removing the first removable mold tool from the modular mold assembly, and inserting the first removable mold tool into an alternate modular mold assembly so that the mold surface of the first removable mold tool is disposed at and partially defines an alternate mold cavity of the alternate modular mold assembly, the alternate mold cavity having a different shape or volume than the mold cavity of the modular mold assembly. The method may include disposing additional polymeric material at the alternate mold cavity, and thermoforming the additional polymeric material in the alternate mold cavity into a different bladder having the different shape or volume of the alternate mold cavity and having a wall with an outer surface having the nonuniform topography imparted by the topography of the mold surface of the first removable mold tool. Stated differently, a removable mold tool may be used in different mold assemblies to make bladders of different configurations (shapes and/or volumes) but with the same nonuniform topography at the portion of the bladder thermoformed against the removable mold tool.

In one implementation of the method, the first removable mold tool may define channels extending through the removable mold tool to the mold surface. The method may include applying a vacuum to the mold cavity through the channels to pull the polymeric material against the mold surface.

In a configuration, the topography of the mold surface of the first removable mold tool may include pyramidical cavities and the nonuniform topography of the outer surface of the bladder may include pyramidical shapes corresponding with the pyramidical cavities of the mold surface of the first removable mold tool, the pyramidical shapes having peaks extending outward from the bladder.

In a configuration, the topography of the mold surface of the removable mold tool may include grooves and the nonuniform topography of the outer surface of the bladder may include ribs corresponding with the grooves of the mold surface of the removable mold tool. For example, the nonuniform topography of the outer surface of the bladder may be at a side wall of the bladder and the ribs may extend lengthwise in a direction extending from a front wall of the bladder to a rear wall of the bladder, or the ribs may extend vertically in a direction from a top wall of the bladder to a bottom wall of the bladder. In some embodiments, the ribs may be parallel.

In still another configuration, the mold surface may include a plurality of flat regions defining irregular polygons. At least some of the flat regions may be angled relative to one another. In addition to providing an aesthetically pleasing outer surface of the side wall of the bladder, the nonuniform topography may affect the compressive stiffness of the side wall of the bladder, may provide increased traction at the side wall and/or may increase the surface roughness of the side wall in comparison to a bladder formed in a mold assembly having the mold surface of the base defining the entire cavity (e.g., a nonmodular mold assembly without the removable mold tool). In comparison to a bladder with side walls that are smooth (e.g., do not have a nonuniform topography), a bladder having a side wall with the nonuniform topography may provide a greater resiliency (e.g., quicker spring back) of the bladder to its uncompressed shape when dynamic compressive loading is removed.

In an aspect, the method may include inflating the bladder and sealing the bladder to retain fluid in the bladder. In another aspect, the method may include disposing the bladder within a sole structure of an article of footwear at an opening defined by the sole structure so that the nonuniform topography of the outer surface of the bladder is aligned with the opening.

In an example, a wearable article may include a bladder having a peripheral flange enclosing a sealed, fluid-filled interior cavity. The bladder may have a side wall that has an outer surface with a nonuniform topography. For example, the bladder may include a first polymeric sheet bonded to a second polymeric sheet at the peripheral flange, with one of the first or second polymeric sheets defining the side wall.

The nonuniform topography may include pyramidical shapes having peaks extending outward from the bladder. The nonuniform topography may include grooves extending lengthwise in a direction from a front wall to a rear wall of the bladder. The nonuniform topography may include grooves extending vertically between a top wall and a bottom wall of the bladder. The outer surface of the bladder may include a plurality of flat regions defining irregular polygons. At least some flat regions may be angled relative to one another.

In an example, the wearable article may be an article of footwear. The nonuniform topography of the bladder may be disposed at a side of a sole structure of the article of footwear. This may be achieved, for example, by disposing the side of the bladder with the nonuniform topography at the medial side or the lateral side of the sole structure.

In an example, a thickness of the side wall of the bladder at the outer surface with the nonuniform topography may be equal to or greater than a thickness of the bladder adjacent to the nonuniform topography.

The above features and advantages and other features and advantages of the present teachings are readily apparent from the following detailed description of the modes for carrying out the present teachings when taken in connection with the accompanying drawings.

Referring to the drawings, wherein like reference numbers refer to like components, FIG. 1 shows a modular mold assembly 10 configured to be used for thermoforming bladders with a variety of different surface topographies through the use of removable mold tools as discussed herein. The modular mold assembly 10 has a lower portion 12 and a base 14. The lower portion 12 may include a plurality of interconnected vent passages in fluid communication with passages in the base that are in turn in fluid communication with channels in the removable mold tools discussed herein. The base 14 is secured to the lower portion 12 via fasteners such as bolts that extend through through-hole openings 15 in the base 14 into threaded blind holes in the lower portion 12. The through-hole openings 15 are shown at the corners of the base 14 of the modular mold assembly 10. No fasteners are shown in the openings 15 on FIG. 1. Fasteners may also extend through another mold portion 24 shown in FIGS. 4 and 11 (not shown in FIG. 1) to secure the mold portion 24 to the base 14 in FIG. 1 to cover and enclose the mold cavities 20A-20C.

Figure 2:
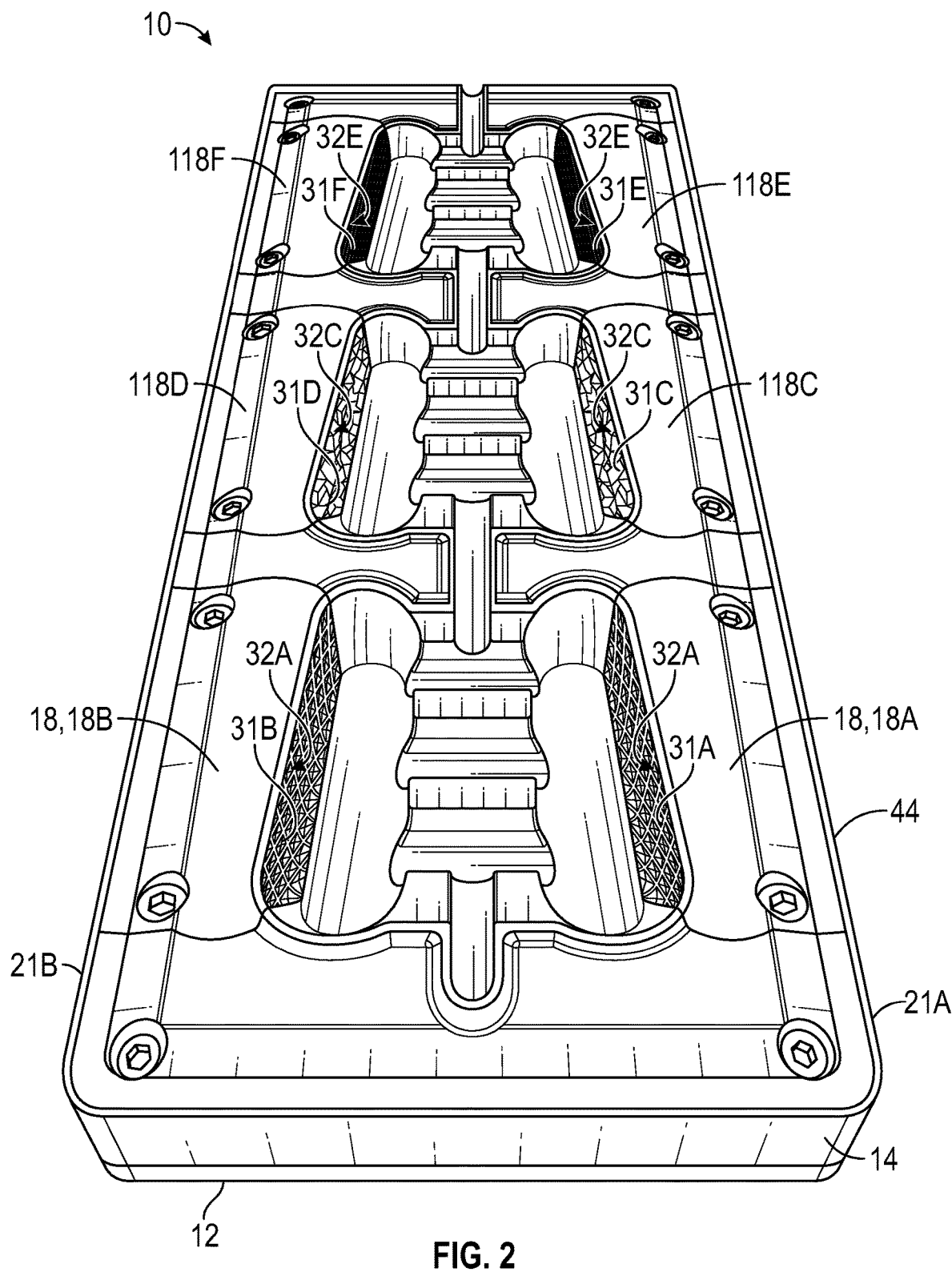
FIG. 2 is a perspective view of the modular mold assembly of FIG. 1 with some of the removable mold tools replaced with alternate removable mold tools.

The modular mold assembly 10 includes one or more removable mold tools 18A-18F (referred to collectively as removable mold tools 18) that interfit with the base 14 and are removably secured to the lower portion 12 by fasteners 16 that extend through the base 14 and into the lower portion 12 though openings part or all of which may be threaded. The extension of one such fastener 16 through the base 14 and into the lower portion 12 is indicated with hidden lines in FIG. 1. Each of the mold tools 18A-18F has an inner wall 31 with a mold surface with the same nonuniform topography that is shown and discussed in greater detail with respect to FIGS. 5-6 (e.g., the mold surface 32A). In other embodiments, some or all of the mold tools 18A-18F may be removed and replaced with another mold tool having an inner wall 31 with a mold surface with a different nonuniform topography. For example, as shown in FIG. 2, mold tools 18A and 18B have an inner wall 31A, 31B, respectively, with a mold surface 32A with a nonuniform topography, the mold tools 118C and 118D have an inner wall 31C and 31D, respectively, each having a mold surface 32C with the nonuniform topography discussed with respect to FIGS. 14-15, which is different than the nonuniform topography of the mold surface 32A. The mold tools 118E and 118F have an inner wall 31E, 31F, respectively, each having a mold surface 32E with the nonuniform topography discussed with respect to FIGS. 18-19, which is different than the nonuniform topography of the mold surface 32A. In other embodiments, fewer or more of the removable mold tools may have mold surfaces with different nonuniform topographies. For example, the mold tools placed opposite one another may have different nonuniform topographies than one another. For example, mold tool 118D may be placed opposite mold tool 18A (e.g., in place of mold tool 18B) to partially define the mold cavity 20, or other combinations of the mold tools may be used.

Figure 4:
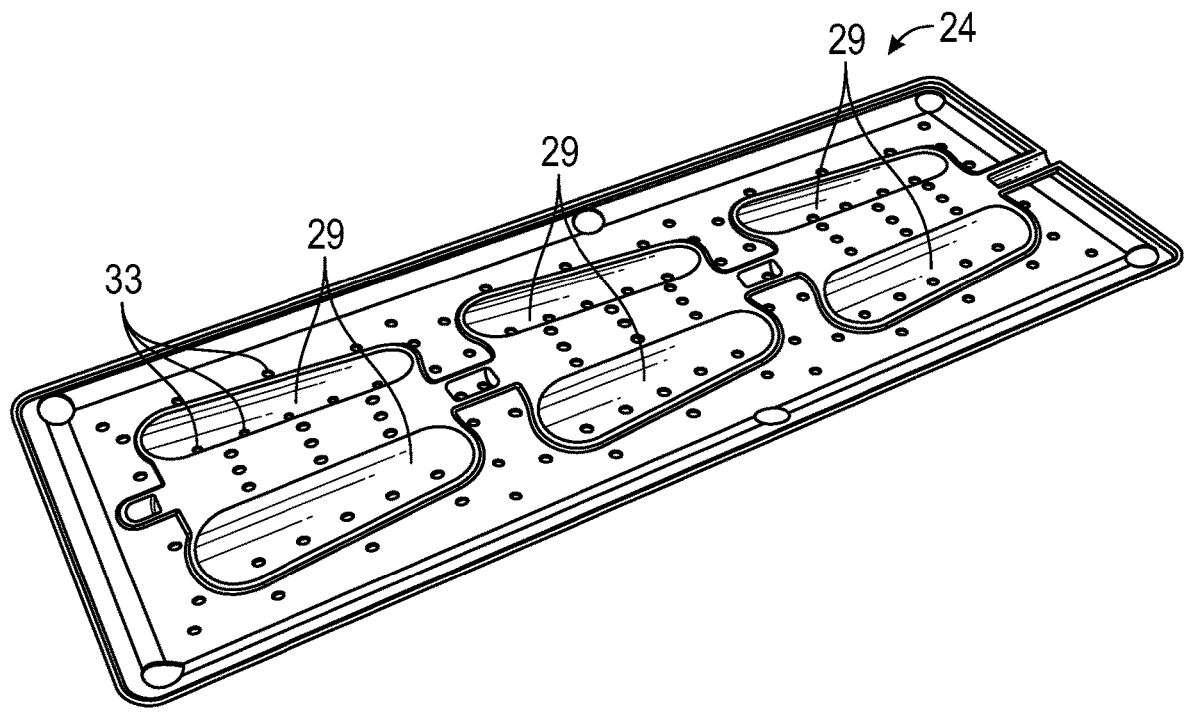
FIG. 4 is a perspective view of a bottom side of a top portion of the modular mold assembly.

Together, the base 14, the mold portion 24, and the removable mold tools 18A-18F or 118C-118F define mold cavities. In the embodiment of the modular mold assembly 10, there are six removable mold tools 18 labelled 18A, 18B, 18C, 18D, 18E, and 18F and three mold cavities 20 labelled 20A, 20B, and 20C. As shown in FIG. 4, the mold portion 24 includes six recessions 29. Each recession 29 aligns with a different one of the two primary volumes of the mold cavities 20A, 20B, and 20C (e.g., encloses the top thereof) as illustrated with respect to mold cavity 20A in FIG. 11. Openings to channels 33 (only some of which are labelled in FIG. 4) may be at the surface of the mold portion 24 in the recessions 29 and in communication with the vacuum source 62 of FIG. 11 in order to pull the polymeric sheet 56 against the surface of the mold portion 24 during thermoforming.

The base 14, mold portion 24, (FIG. 11) and the removable mold tools 18A and 18B together define a first mold cavity 20A. The base 14, mold portion 24, and the removable mold tools 18C and 18D together define a second mold cavity 20B. The base 14, mold portion 24, and the removable mold tools 18E and 18F together define a third mold cavity 20C. Each mold cavity 20A, 20B, and 20C has two primary volumes interconnected by multiple cross-passages 20E as shown in FIG. 1. Longitudinal passages 20F extend between adjacent mold cavities and at the front and rear of the mold cavities. One of the longitudinal passages 20F1 extends out of an end wall of the mold assembly 10. The mold cavities 20A, 20B, 20C are thus interconnected by the longitudinal passages 20F. The end longitudinal passage 20F1 will mold an inflation port on a bladder thermoformed in the modular mold assembly 10. The inflation port permits access to a source of inflation gas to allow inflation of the bladder, and may then be sealed.

Because the base 14 and the removable mold tools 18 define the respective mold cavities 20A, 20B, and 20C, the dimensional tolerances of the removable mold tools 18A-18F and the base 14 are relatively narrow at the interfaces 26 of the removable mold tools 18A-18F and the base 14. For example, the dimensional tolerance of the removable mold tools 18A-18F and of the base 14 may be 3 millimeters. Some of the interfaces 26 are indicated in FIG. 1. The interfaces 26 are between the front and rear walls of each mold tool 18 in FIG. 1 and the faces of the side walls of the base 14 at the openings into which each removable mold tool 18 is inserted. With a dimensional tolerance of 3 millimeters for each of the tools 18A-18F and the base 14, the maximum gap between the faces of the mold tool 18 and the side wall of the base 14 at the interface 26 is 6 millimeters. Alternatively, the dimensional tolerance for each of the tools 18A-18F and the base 14 may be such that the maximum gap at the interface 26 is 3 millimeters (e.g., each having a dimensional tolerance of 1.5 millimeters). Because these interfaces 26 extend to the mold surfaces in the mold cavities 20A, 20B, 20C, the fit of the removable mold tools 18 to the base 14 should be sufficiently precise so that the interfaces do not result in a mark (protrusion or depression) in the walls of the bladder formed in the modular mold assembly 10. The nonuniform mold surfaces of the removable mold tools 18 discussed herein extend to the interfaces 26 (e.g., across the entire portion of the removable mold tool 18 presented at and forming part of the mold cavity 20). This may help make any marking due to gaps at the interfaces 26 less noticeable, as the interfaces 26 are a boundary between nonuniform topographies of the mold surfaces 32 of the removable mold tools 18 and the more uniform/smoother topographies of the mold surfaces 30 of the base 14.

The base 14 also includes a mold surface 30 that partially defines the mold cavity 20, 20A. The removable mold tool 18A has a mold surface 32, 32A that is disposed at and further defines the mold cavity 20A. Likewise, the removable mold tool 18B has a mold surface 32, 32B that is disposed at and further defines the mold cavity 20A. The removable mold tools 18C-18F have similar mold surfaces 32C, 32D that define the mold cavity 20B and mold surfaces 32E, 32F that define the mold cavity 20C, respectively. The base 14 has mold surfaces 30B and 30C that further define the mold cavities 20B and 20C, respectively. The mold surfaces 32A-32F of the various removable mold tools 18 are collectively referred to as mold surface 32. The nonuniform topography of the mold surface 32 of each of the removable mold tools 18A-18F is different than the topography of the mold surface 30 of the base 14.

Figure 3:
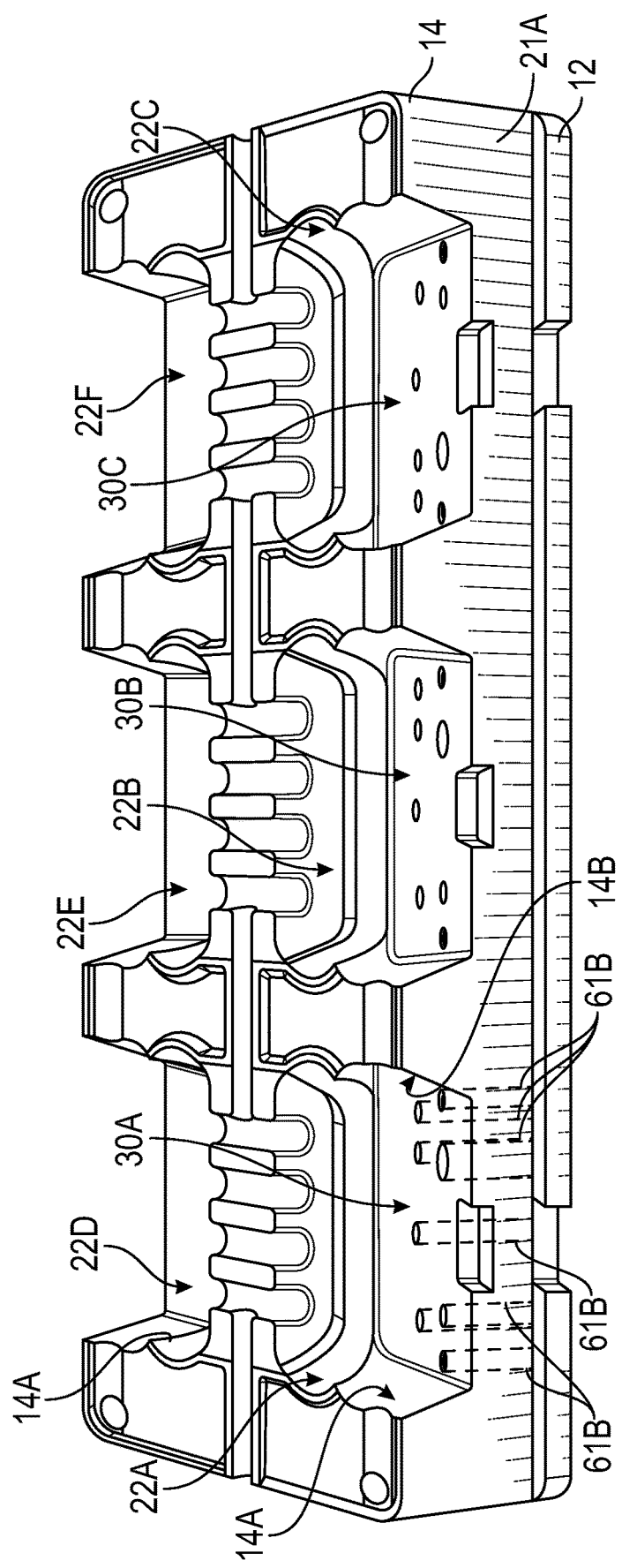
FIG. 3 is a side perspective view of a base and lower portion of the modular mold assembly with the removable mold tools removed.

FIG. 3 shows the base 14 and lower portion 12 with the removable mold tools removed. The base 14 has a first side wall 21A that defines three openings 22A, 22B, and 22C into which the respective removable mold tools 18A, 18C and 18E fit. As shown in FIG. 2, removable mold tools 118C and 118E also fit into openings 22B and 22C, respectively. In fact any of the mold tools 18A, 18C, 18E, 118C, and 118E fit into and can be inserted into any of the openings 22A, 22B, and 22C. Similarly, the base 14 has a second side wall 21B (labelled in FIG. 1) opposite from the first side wall 21A, and that defines three openings 22D, 22E, and 22F that are mirror images of the openings 22A, 22B, and 22C, respectively. Respective removable mold tools 18B, 18D and 18F fit into openings 22D, 22E and 22F, respectively, as shown in FIG. 1. As shown in FIG. 2, removable mold tools 118D and 118F also fit into openings 22E and 22F, respectively. In fact any of the mold tools 18B, 18D, 18F, 118D, and 118F fit into and can be inserted into any of the openings 22D, 22E, and 22F.

The first removable mold tool 18A fits in the first opening 22A in the first side wall 21A of the base 14 with less than a predetermined clearance at each interface 26, and with the mold surface 32A of the first removable mold tool 18A adjacent to the mold surface 30A of the base 14 and further defining the mold cavity 20. The additional removable mold tools 18B, 18C, 18D, 18E, and 18F fit into the respective openings 22D, 22B, 22E, 22C, and 22F with a similar precise fit at the interfaces 26.

Figure 11:
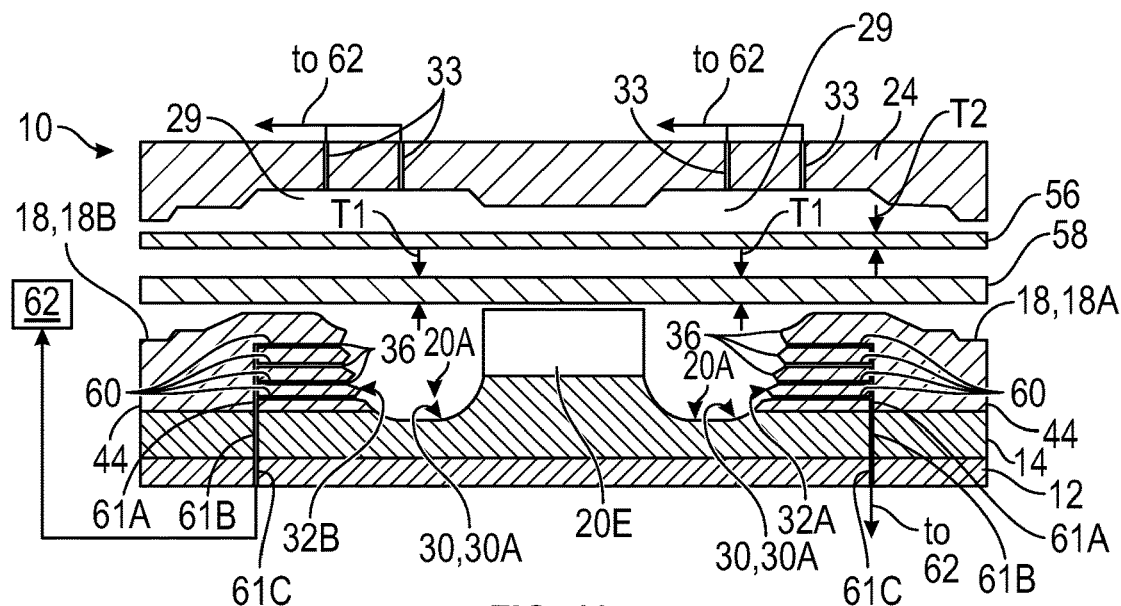
FIG. 11 is an exploded cross-sectional view of the mold assembly of FIG. 1 taken at lines 11-11 in FIG. 1, with polymeric sheets between mold portions of the mold assembly.
Figure 12:
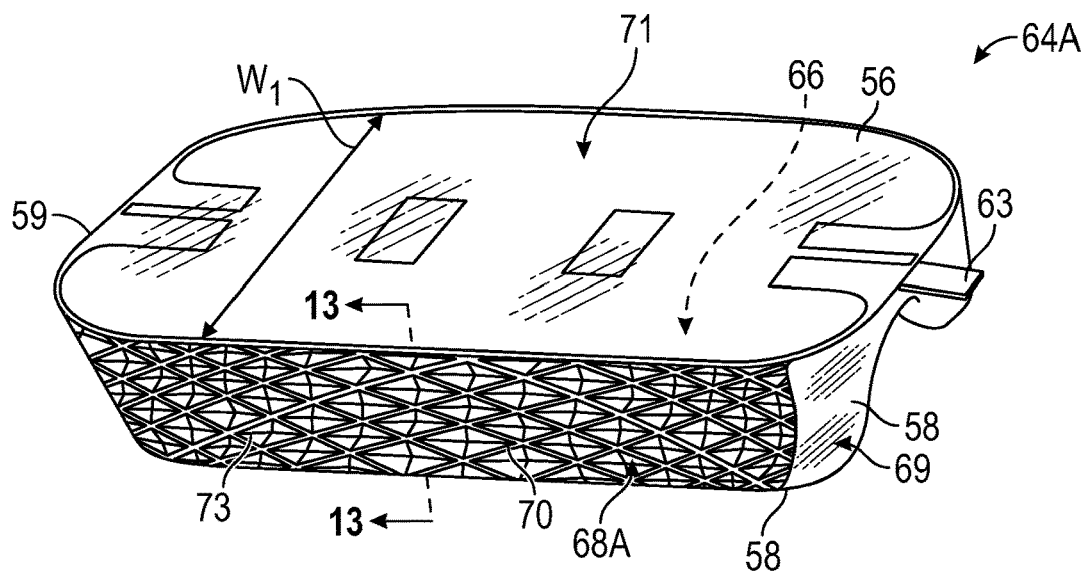
FIG. 12 is a perspective view of a bladder that was thermoformed in the mold assembly of FIG. 11.

In FIG. 1, the removable mold tools 18A-18F are selected to provide identical nonuniform topographies on the outer surfaces of the side walls of bladders 64A formed in the mold cavity 20A as described herein with respect to FIGS. 11 and 12. In FIG. 2, the removable mold tools 18C, 18D, 18E, and 18F are removed and alternate removable mold tools 118C, 118D, 118E, and 118F (which may be referred to as second removable mold tools) are inserted into the modular mold assembly 10 in their respective places. The nonuniform topography of the mold surface of the removable mold tools 118C, 118D imparts a different nonuniform topography on the outer surface of the side walls of bladders 64B formed in the mold cavity 20B as described with respect to FIGS. 14-16. The nonuniform topography of the mold surface of the removable mold tools 118E, 118F imparts yet another different nonuniform topography on the outer surface of the side walls of bladders 64C thermoformed in the mold cavity 20C as described with respect to FIGS. 18-21. Accordingly, bladders with side walls having outer surfaces with different nonuniform topographies can be provided by inserting different removable mold tools into the modular mold assembly 10. This may allow production of various differently configured bladders at a lower tooling expense, as some portions of the modular mold assembly (e.g., the lower portion 12 and the base 14) are used in forming all of the different bladders, and only the removable mold tools 18A-18F need be specifically configured for the desired surface topography of the bladder side walls.

Figure 5:
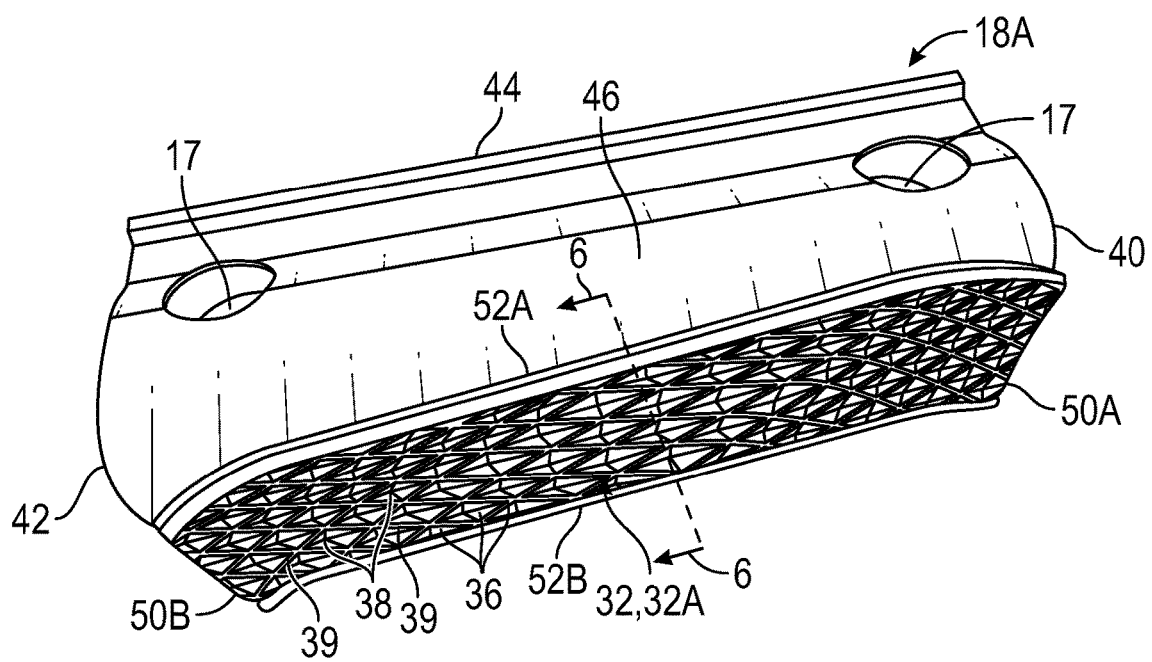
FIG. 5 is a perspective view of a removable mold tool of FIG. 1 showing a mold surface with a nonuniform topography and the top of the removable mold tool.
Figure 7:
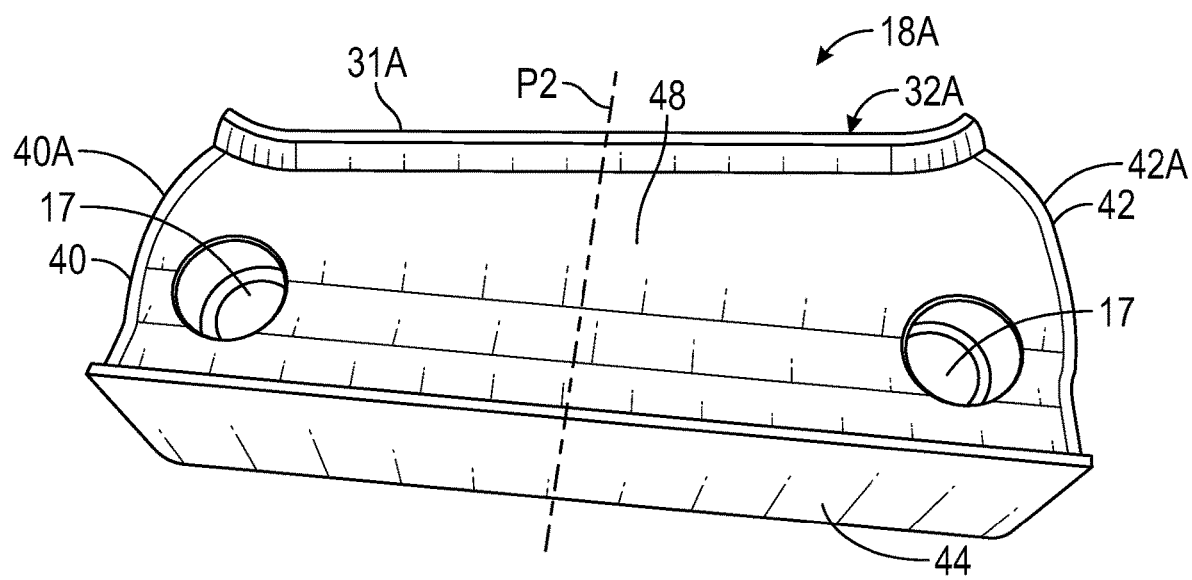
FIG. 7 is a perspective view of an outer side and the top of the removable mold tool of FIG. 5.
Figure 8:
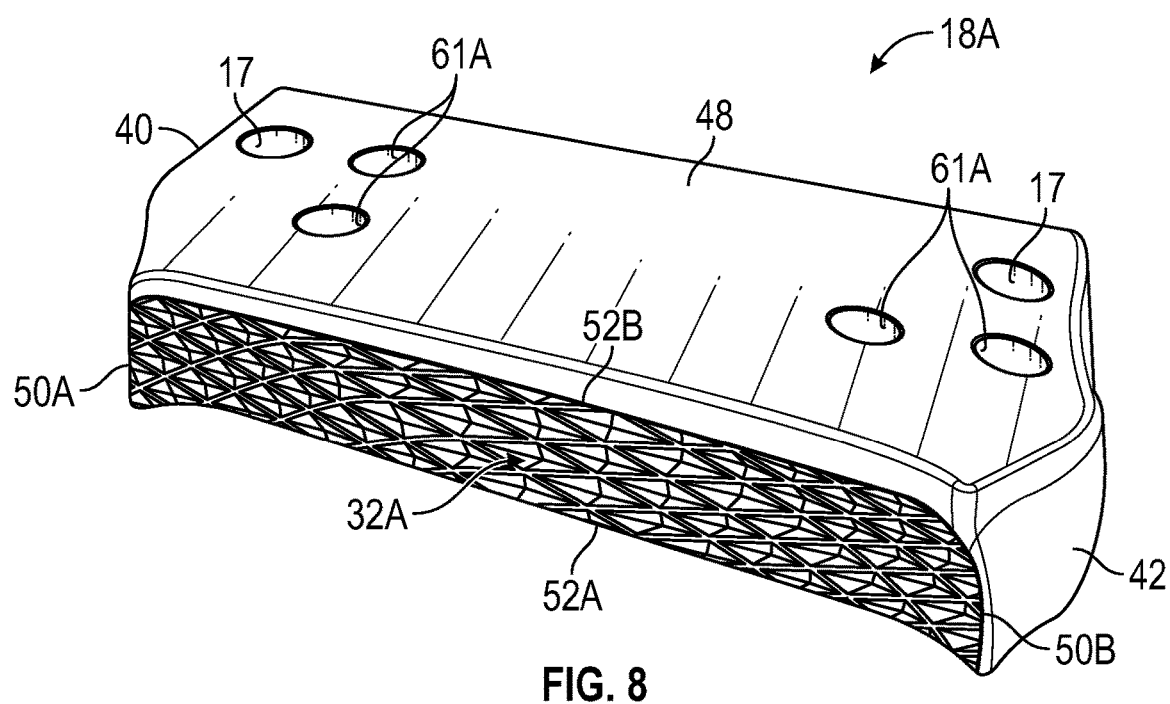
FIG. 8 is another perspective view of the removable mold tool of FIG. 5 showing the mold surface and the bottom of the removable mold tool.

Referring to FIG. 5, the mold tool 18A is shown with the mold surface 32A having a topography that includes a plurality of pyramidical cavities 36 extending into the mold tool 18A. The mold surface 32 includes four small angled walls at each cavity 36 that converge at a point 38 at the bottom of each cavity 36. Ridges 39 at the base of each cavity 36 separate the cavities 36. As shown in FIG. 5, the mold surface 32A with the pyramidical cavities 36 extends from a front wall 40 to a rear wall 42 of the mold tool 18A. Through holes 17 extend through the mold tool 18A from a top wall 46 to a bottom wall 48 (shown in FIG. 7) and are sized for receiving the fasteners 16 of FIG. 1 to mount the mold tool 18A to the lower portion 12. As shown in FIG. 7, the outer wall 44 of the mold tool 18A is generally flat and is exposed at the outside of the modular mold assembly 10 in line with (e.g., flush with) the side wall 21A of the base 14 as shown in FIG. 1.

Figure 9:
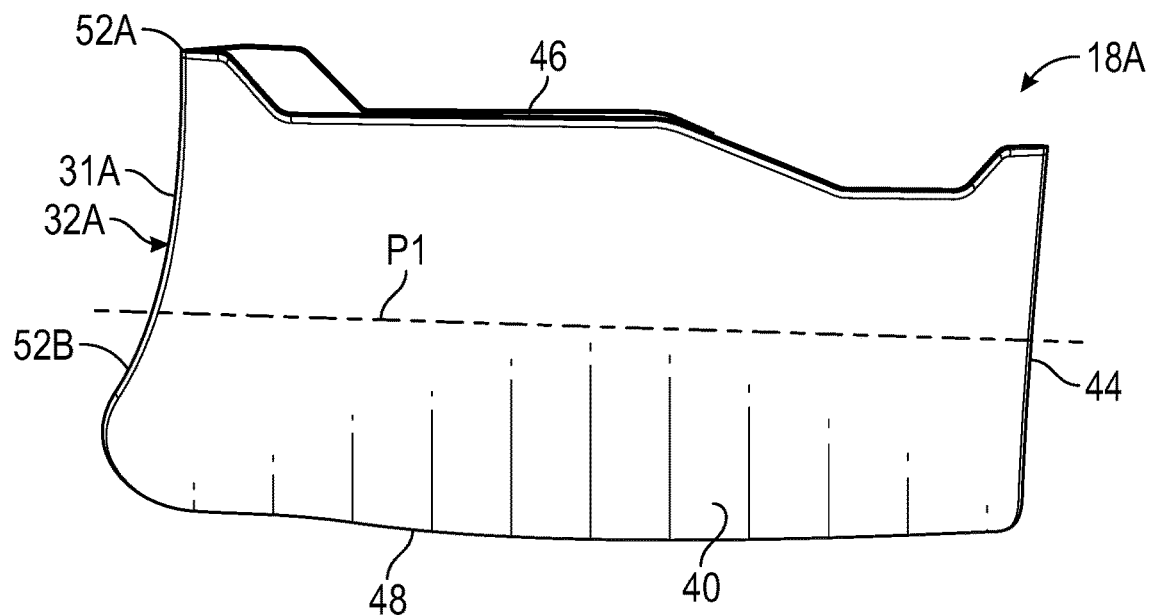
FIG. 9 is an end view showing a front wall of the removable mold tool of FIG. 5.

As is apparent from the combined views of FIGS. 5-10, the mold surface 32A is concave in two directions. That is, the mold surface 32A is slightly concave in a direction from the front wall 40 to the rear wall 42 (e.g., from a front edge 50A to a rear edge 50B of the mold surface 32A, as shown in FIG. 5), and is also concave in a vertical direction from the top wall 46 to the bottom wall 48 (e.g., from top edge 52A to the bottom edge 52B of the mold surface 32A, as best shown in FIG. 9). The mold tool 18A is thus able to produce bladders 64A with a portion that is convex along both its height and width, such as side walls that are slightly concave (e.g., rounded) in the same two directions.

The first removable mold tool 18A includes the outer wall 44 opposite from the inner wall 31A. The rear wall 42 is opposite from the front wall 40. The bottom wall 48 is opposite from the top wall 46. Each of the front wall 40, the rear wall 42, the top wall 46, and the bottom wall 48 extends from the outer wall 44 to the mold surface 32A. As best shown in FIG. 7, the rear wall 42 is wider than the front wall 40. As best shown in FIG. 9, the bottom wall 48 is wider than the top wall 46. The front wall 40 has a surface area less than a surface area of the rear wall 42. The top wall 46 has a surface area less than a surface area of the bottom wall 48. For example, a projected surface area of the top wall 46 projected onto a plane P1 extending through the first removable mold tool 18A between the top wall 46 and the bottom wall 48 is less than a projected surface area of the bottom wall 48 projected onto the plane P1. Similarly, a projected surface area of the front wall 40 projected onto a plane P2 extending through the first removable mold tool 18A between the front wall 40 and the rear wall 42 is less than a projected surface area of the rear wall 42 projected onto the plane P2. Stated differently, the footprint of the top wall 46 is less than that of the bottom wall 48, and the footprint of the front wall 40 is less than that of the rear wall 42.

As best shown in FIG. 7, both the front wall 40 and the rear wall 42 are non-planar. For example, at least a portion 40A of the front wall 40 is convex and at least a portion 42A of the rear wall 42 is convex. As shown in FIG. 3, the surface 14A of the base 14 that will confront the portion 40A of the front wall 40 is concave (e.g., at interface 26), and the surface 14B of the base 14 that will confront the portion 42A of the rear wall 42 is concave (e.g., at interface 26). This allows the first removable mold tool 18A to be wedged into the first opening 22A in a direction toward the mold cavity 20A, easily providing a correct alignment of the mold surface 32A of the first removable mold tool 18A with the mold surface 30A of the base 14. A length of the outer wall 44 is greater than a length of the inner wall 31A, as best shown in FIG. 7, further contributing to the ability to wedge the first removable mold tool 18A into the first opening 22A to align the mold surface 32A of the first removable mold tool with the mold surface 30A of the base 14. As shown in FIGS. 1 and 2, when properly aligned with the first removable mold tool 18A in the first opening 22A of the side wall 21A of the base 14, the outer wall 44 of the first removable mold tool 18A is flush with the side wall 21A of the base.

Such relative dimensions and shape of the first removable mold tool 18A provides several advantages. First, the first removable mold tool 18A may be wedged into the first opening 22A in a direction toward the mold cavity 20A, easily providing a correct alignment of the mold surface 32A of the first removable mold tool 18A with the mold surface 30A of the base 14. Additionally, the first removable mold tool 18A fits into the first opening 22A in only one orientation, as the surface 14A of the base 14 fits only to (e.g., can interface only with) the front wall 40, and the surface 14B of the base 14 fits only to (e.g., can interface only with) the rear wall 42. The second opening 22D is opposite from the first opening 22A and configured as a mirror image of the first opening 22A. The first removable mold tool 18A will not fit into the second opening 22D, preventing inadvertent misplacement of the first removable mold tool 18A during manufacturing. Additionally, the first removable mold tool 18A will not fit into the first opening 22A if placed upside down or backward.

Referring to FIG. 2, the removable mold tool 18B may be referred to as a second removable mold tool and fits lengthwise in the second opening 22D with the mold surface 32B of the second removable mold tool 18B adjacent to the mold surface 30A of the base 14 and further defining the mold cavity 20A. The second removable mold tool 18B includes an outer wall 144 opposite from an inner wall 31B, a front wall 140 opposite from a rear wall 142, a top wall 146, and a bottom wall (not shown) opposite from the top wall 146. The top wall 146, the bottom wall, the front wall 140, and the rear wall 142 of the second removable mold tool 18B are mirror images in shape and dimension of the top wall 46, the bottom wall 48, the front wall 40, and the rear wall 42, respectively, of the first removable mold tool 18A. Each of the front wall 140, the rear wall 142, the top wall 146, and the bottom wall of the second removable mold tool 18B extend from the outer wall 144 to the mold surface 32B, with the rear wall 142 of the second removable mold tool 18B wider than the front wall 140 of the second removable mold tool 18B and the bottom wall of the second removable mold tool 18B wider than the top wall 146 of the second removable mold tool.

Because each mold tool 18, 18A is separately inserted and removed from the base 14, the topographies of the mold surfaces 32A, 32B of the removable mold tools 18A, 18B may be but need not be the same. For example, although shown as the same in FIG. 2, the mold surface 32B of the second removable mold tool 18B may instead have a nonuniform topography different from the nonuniform topography of the first removable mold tool 18A. As shown in FIG. 12, the mold surface 32A of the first removable mold tool 18A imparts the nonuniform topography to the outer surface 68A of a first outer side wall 73 of the bladder 64A thermoformed in the modular mold assembly 10, and the mold surface 32B of the second removable mold tool 18B (shown in FIG. 11) imparts a nonuniform topography to a second outer side wall of the bladder 64A. The second outer side wall is not shown but is opposite to the first outer side wall 73 in FIG. 12 and may be a mirror image thereof. For example, the nonuniform topologies may be at outer side walls at the medial and lateral side, respectively, of the bladder 64A for an article of footwear, as shown with respect to the medial side of article of footwear 110 in FIG. 24.

Figure 10:
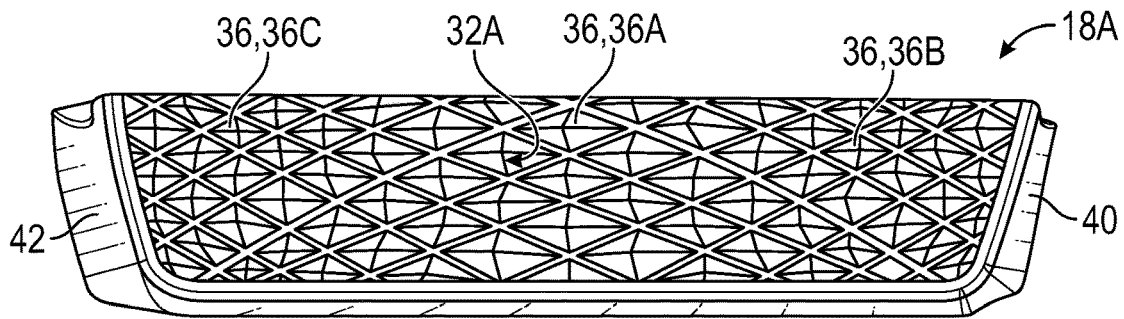
FIG. 10 is a side view of the removable mold tool of FIG. 5 showing the mold surface.

FIG. 10 illustrates that at least some of the pyramidical cavities 36 at the mold surface 32A vary in size. For example, pyramidical cavities 36 near the center of the mold surface 32A may be larger in width and height than those nearer to the front or rear walls 40, 42, as indicated by pyramidical cavity 36A being wider than pyramidical cavity 36B and wider than pyramidical cavity 36C. The cavities 36A, 36B, 36C also may have the same or different depths (e.g., the distance that the cavity extends toward the outer wall 44.

FIG. 11 shows the modular mold assembly 10 with polymeric material in the form of a first polymeric sheet 56 and a second polymeric sheet 58 placed between the mold portion 24 and the lower components of the modular mold assembly 10 (e.g., the removable mold tools 18A, 18B, the base 14 and the lower portion 12. The polymeric sheets 56, 58 are a polymeric material used to form the bladder 64A of FIG. 12. In other embodiments, polymeric material may be blow molded in the mold cavities 20A-20C against the base 14 and the removable mold tools 18 or 118.

The first and second polymeric sheets 56, 58 can be a variety of polymeric materials that can resiliently retain a fluid such as nitrogen, air, or another gas. Examples of polymeric materials for the first and second polymeric sheets 56, 58 include thermoplastic urethane, polyurethane, polyester, polyester polyurethane, and polyether polyurethane. Moreover, the first and second polymeric sheets 56, 58 can each be formed of layers of different materials including polymeric materials. In one embodiment, each of the first and second polymeric sheets 56, 58 is formed from thin films having one or more thermoplastic polyurethane layers with one or more barrier layers of a copolymer of ethylene and vinyl alcohol (EVOH) that is impermeable to the pressurized fluid contained therein such as a flexible microlayer membrane that includes alternating layers of a gas barrier material and an elastomeric material, as disclosed in U.S. Pat. Nos. 6,082,025 and 6,127,026 to Bonk et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. Additional suitable materials for the first and second polymeric sheets 56, 58 are disclosed in U.S. Pat. Nos. 4,183,156 and 4,219,945 to Rudy which are incorporated by reference in their entireties. Further suitable materials for the first and second polymeric sheets 56, 58 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladders disclosed herein, engineering properties such as tensile strength, stretch properties, fatigue characteristics, dynamic modulus, and loss tangent can be considered. For example, the thicknesses of the first and second polymeric sheets 56, 58 used to form the bladder can be selected to provide these characteristics.

Figure 6:
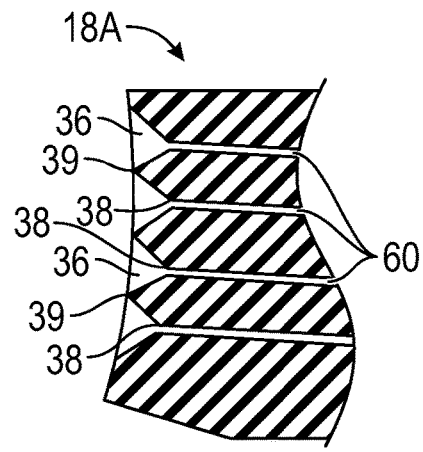
FIG. 6 is a fragmentary cross-sectional view of the removable mold tool of FIG. 5 taken at lines 6-6 in FIG. 5.

Each removable mold tool 18A, 18B defines channels 60 (see, e.g., FIGS. 6 and 11) that extend through the removable mold tool 18A or 18B from the mold surface 32A or 32B to communicate with conduits 61A (shown in FIG. 8) that extend to the bottom wall 48. A channel 60 may open at the lowest point 38 of a cavity 36 (e.g., at the bottom of the cavity 36) as shown in FIGS. 6 and 11 or may instead or in addition open elsewhere on the mold surface 32, such as at a high point of the mold between cavities 36. The opening of the channel 60 at the mold surface 32 may be relatively small so as not to appear on the bladder formed at the mold surface 32. For example, the width of the opening of each channel 60 at the mold surface 32 may be 0.0020 millimeters. A vacuum source 62 may be connected with and applied to the channels 60 so that a vacuum is applied to the mold cavity 20A through the channels 60 during thermoforming to pull the second polymeric sheet 58 against the mold surface 32. The vacuum helps to pull the polymeric sheet 58 fully into the cavities 36 against the mold surface 32 to fully impart the nonuniform topography of the mold tool 18A or 18B to the polymeric sheet 58 during thermoforming of the sheets 56, 58 into a bladder 64A, shown in FIGS. 12 and 13. The base 14 may define at least one conduit 61B (shown in FIGS. 3 and 11) in fluid communication with the channels 60 and conduits 61A of the first removable mold tool 18A. The lower portion 12 may define openings at conduits 61C that communicate with the conduit(s) 61B and then extend through the lower portion 12 to the vacuum source 62. For example, the channels in the lower portion 12 may extend horizontally from the conduits 61C to the sides of the lower portion 12 and connect to the vacuum source 62.

FIG. 12 shows the thermoformed bladder 64A after removal from the modular mold assembly 10, inflation, and sealing. The bladder 64A defines an interior cavity 66 that retains a fluid at a predetermined inflation pressure. As used herein, a "fluid" filling the interior cavity 66 may be a gas, such as air, nitrogen, another gas, or a combination thereof. For example, peripheral portions of the polymeric sheets 56, 58 are sealed to one another during thermoforming around the interior cavity 66 at a peripheral flange 59. The interior cavity 66 of the bladder 64A may be inflated through an inflation port 63 that is formed at the longitudinal passage 20F of the mold assembly 10 and is then plugged or otherwise sealed. The bladder 64A is shown trimmed around the peripheral flange 59 in FIG. 12.

The bladder 64A has a side wall 73 with an outer surface 68A with a nonuniform topography imparted by the topography of the mold surface 32A of the removable mold tools 18A, 18B. The outer surface 68A shown is imparted by mold tool 18A. An identical outer surface on the other side of the bladder 64A (not shown in FIG. 12) is imparted by removable mold tool 18B assuming removable mold tool 18B has a mold surface 32B that is a mirror image of mold surface 32A. The mold surface 30, 30A of the base 14 imparts an outer surface 69 at front and rear walls of the bladder 64A that has a relatively smooth (e.g., more uniform) topography than the outer surface 68A of the side wall 73. The outer surface 69 is adjacent to the outer surface 68A. The mold portion 24 imparts an outer surface 71 at the top of the bladder 64A that also has a smoother, more uniform topography than the outer surface 68A of the side wall 73.

Figure 13:
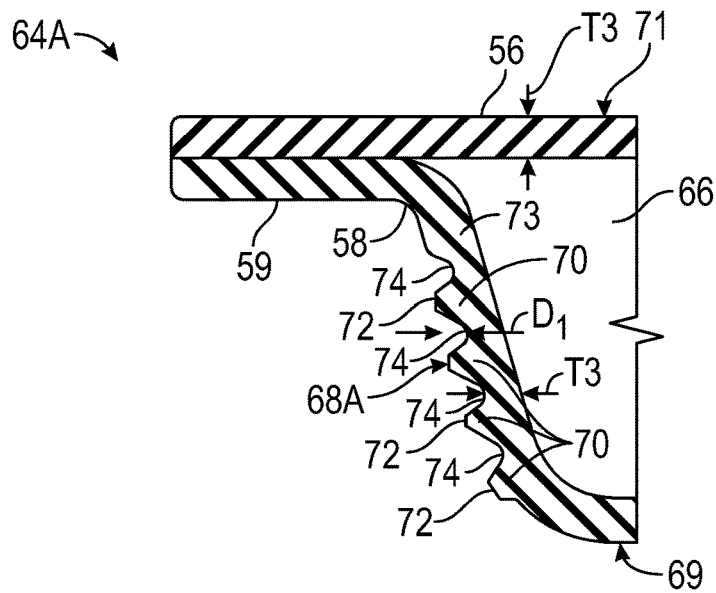
FIG. 13 is a fragmentary cross-sectional view of the bladder of FIG. 12 taken at lines 13-13 in FIG. 12.

In other embodiments, the mold tool 18B could have a mold surface with a different nonuniform topography to impart a different nonuniform topography at the outer surface of the opposite side wall of the bladder 64A. The nonuniform topography of the outer surface 68A of the bladder 64A includes pyramidical shapes 70 corresponding with the pyramidical cavities 36 of the mold surface 32 of the removable mold tool 18A. As best shown in FIG. 13, the pyramidical shapes 70 have peaks 72 extending outward from the bladder 64A and valleys 74 between the peaks 72. The peaks 72 correspond with the depths of the cavities 36 (e.g., the lowest points 38) and are sharply defined due to the vacuum applied through the channels 60. The valleys 74 correspond with the ridges 39 of the mold surface 32 of the mold tool 18A. The outer surface 68A has inflections at the peaks 72 (protrusions) and at the valleys 74 (depressions) evidencing the nonuniform topography.

As can be seen in FIG. 11, the original thickness T1 of the second polymeric sheet 58 is greater than the original thickness T2 of the first polymeric sheet 56. The second polymeric sheet 58 is originally thicker as it stretched further to form both side walls and the bottom portion of the bladder 64A whereas the first polymeric sheet 56 only forms the top portion due to the displacement of the flange from the center of the bladder 64A nearer to the top wall formed by the first polymeric sheet 56. For example, an original thickness T1 (see FIG. 11) of the second polymeric sheet 58 prior to thermoforming is selected so that the minimum thickness T3 of the polymeric sheet 58 after thermoforming (e.g., the thickness at the depths of the valleys 74, see FIG. 13) is not less than a desired final thickness T3. Stated differently, the original thickness T1 is at least as great as the sum of the minimum thickness T3 and the depth D1. Accordingly, all portions of the first polymeric sheet 56 and the second polymeric sheet 58 forming the completed bladder 64A may have the same minimum thickness (at least minimum thickness T3) after thermoforming. The thickness of the side wall 73 of the bladder 64A at the outer surface 68A with the nonuniform topography may be equal to or greater than a thickness of the bladder 64A adjacent to the nonuniform topography.

Figure 14:
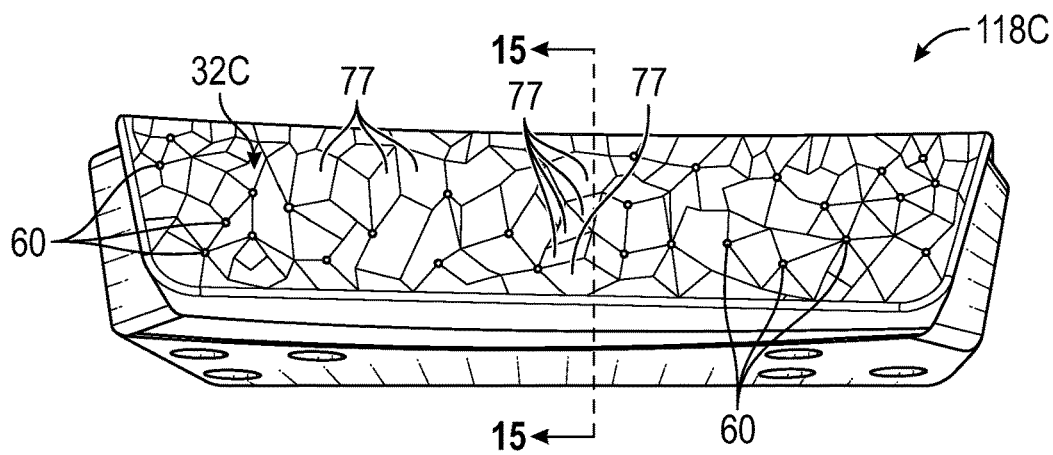
FIG. 14 is a perspective view of another removable mold tool having a mold surface with a different nonuniform topography.
Figure 15:
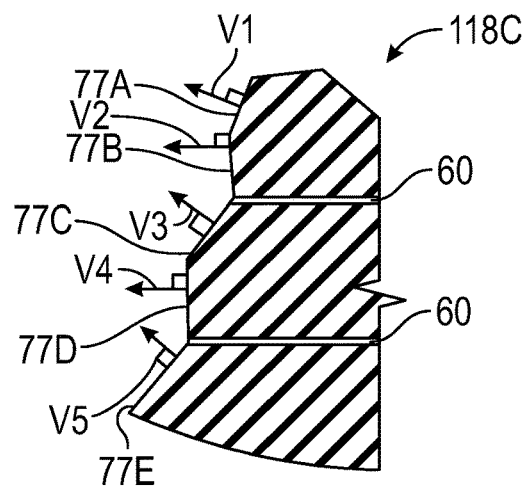
FIG. 15 is a cross-sectional view of the removable mold tool of FIG. 14 taken at lines 15-15 in FIG. 14.

FIG. 14 shows the removable mold tool 118C of FIG. 2. The mold tool 18C has a mold surface 32C with a nonuniform topography that includes flat regions 77 each of which defines an irregular polygon. As best shown in FIG. 15, at least some of the flat regions 77 are angled relative to one another. For example, flat regions 77A, 77B, 77C, 77D, and 77E are angled relative to one another. Vectors V1, V2, V3, V4, and V5 normal to the flat regions 77A, 77B, 77C, 77D, and 77E, respectively, extend at different angles to one another. The removable mold tool 18C has channels 60 (similar to channels 60 of the mold tool 18A) opening at intersections of the flat regions 77. A vacuum may be applied to through the channels 60 to pull the polymeric sheet 58 against the flat regions 77.

Figure 16:
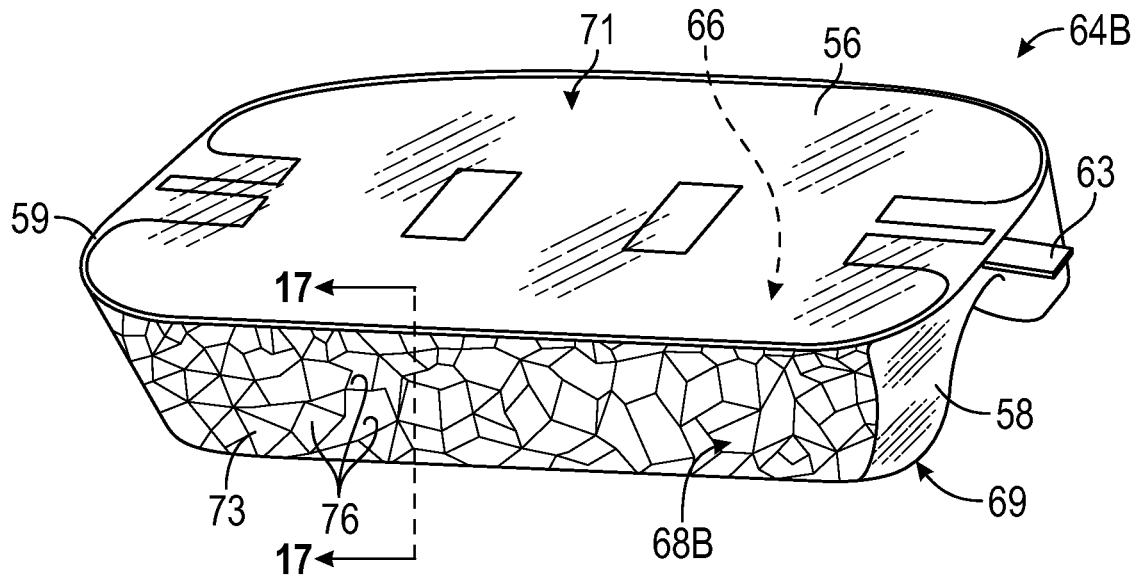
FIG. 16 is a perspective view of a bladder that was thermoformed in the mold assembly of FIG. 2 using the removable mold tool of FIG. 14.
Figure 17:
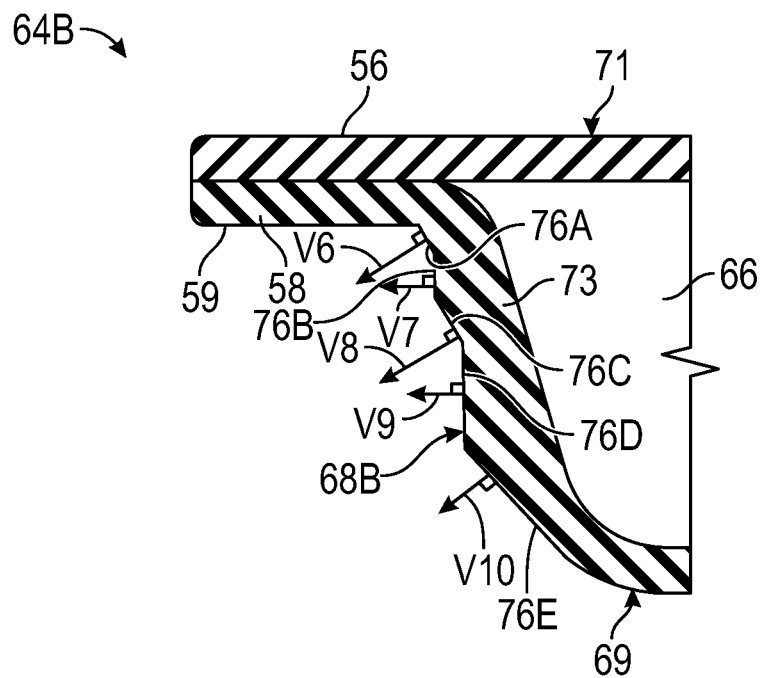
FIG. 17 is a fragmentary cross-sectional view of the bladder of FIG. 16 taken at lines 17-17 in FIG. 16.

The removable mold tool 118C results in a bladder 64B shown in FIG. 16. Stated differently, the mold surface 32C imparts an outer surface 68B at a side wall 73 of the bladder 64B. Referring to FIG. 17, the outer surface 68B includes a plurality of flat regions 76 defining irregular polygons that correspond with (e.g., are the same shape and size as) the flat regions 77 of the mold surface 32C. For example, at least some flat regions 76A, 76B, 76C, 76D, and 76E of the plurality of the flat regions 76 are angled relative to one another so that vectors V6, V7, V8, V9, and V10 normal to the flat regions are angled relative to one another and extend at different angles to one another. The vectors V6, V7, V8, V9, and V10 correspond with vectors V1, V2, V3, V4, and V5, respectively, each corresponding pair extending 180 degrees apart from the other.

The polymeric sheets 56, 58 used to form the bladder 64B may be the same sheets as used to form bladder 64A for example, if the bladders 64A, 64B are simultaneously thermoformed with the mold tools 18A, 18B, 118C, 118D arranged as in FIG. 2. In other embodiments, the removable mold tools may be arranged differently, and different polymeric sheets may be used. Like the bladder 64A, the lower polymeric sheet 58 of the bladder 64B may have a thicker region that confronts the mold surface 32C so that the thickness of the bladder 64B at the outer surface 68B of the side wall 73 with the nonuniform topography is not less than a thickness of the bladder 64B at a region adjacent to the nonuniform topography of the outer surface 68B. Since the base 14 and the mold portion 24 are used in forming both bladders 64A, 64B, the surfaces 69 and 71 of bladder 64B have the same shape and relatively smooth topography as those of bladder 64A.

Figure 18:
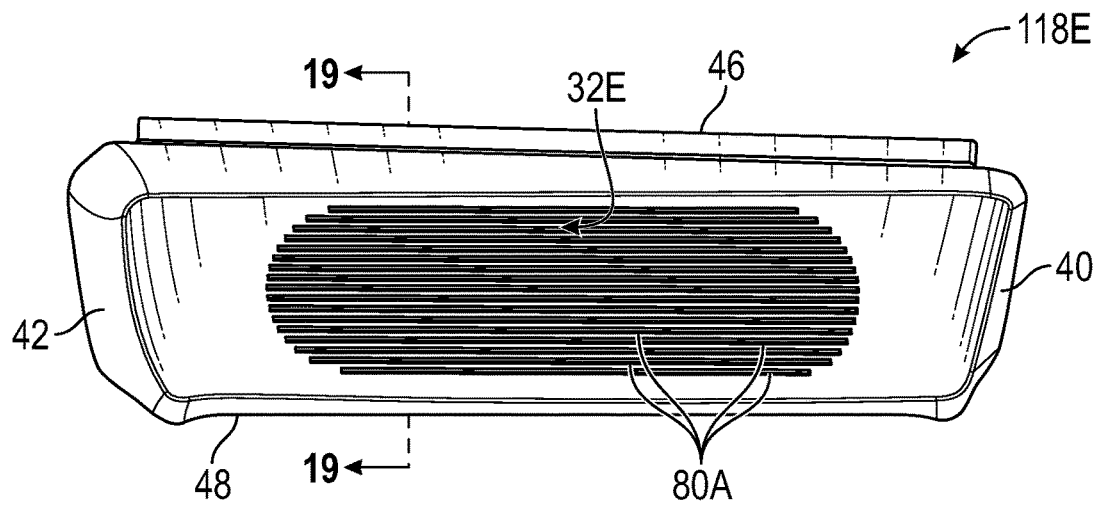
FIG. 18 is a side view of another removable mold tool showing another mold surface with a nonuniform topography.
Figure 19:
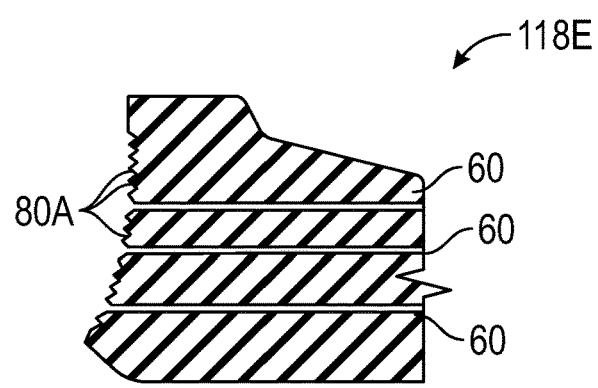
FIG. 19 is a cross-sectional view of the removable mold tool of FIG. 18 taken at lines 19-19 in FIG. 18.
Figure 20:
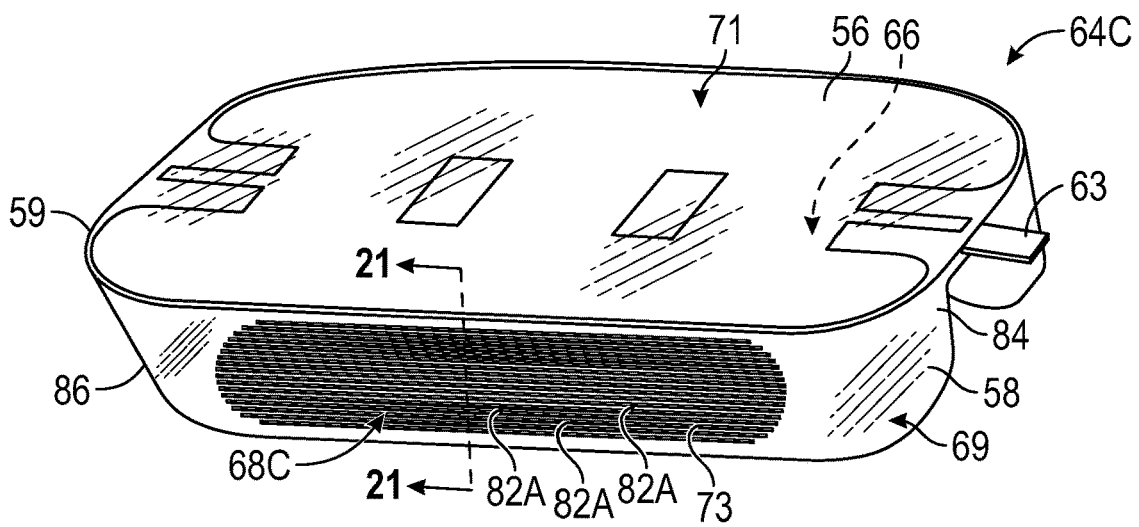
FIG. 20 is a perspective view of a bladder that was thermoformed in the mold assembly of FIG. 2 using the mold tool of FIG. 18.
Figure 21:
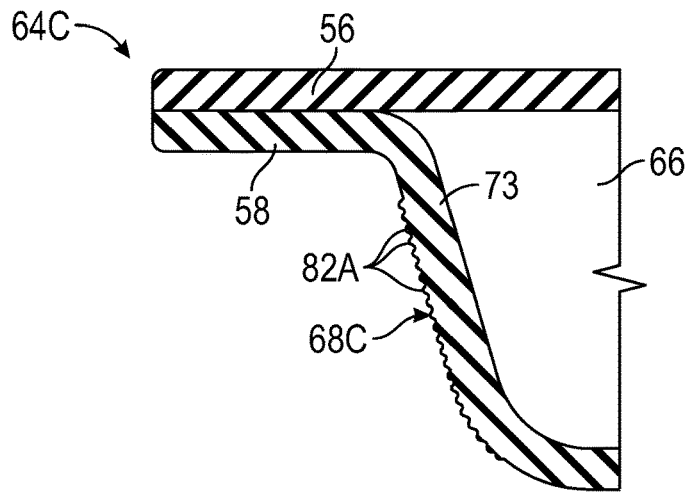
FIG. 21 is a fragmentary cross-sectional view of the bladder of FIG. 20 taken at lines 21-21 in FIG. 20.

FIGS. 18-19 show the removable mold tool 118E of FIG. 2. The topography of the mold surface 32E of the removable mold tool 118E includes parallel grooves 80A extending in a direction from a front wall 40 of the removable mold tool 118E to a rear wall 42 of the removable mold tool 118E. Channels 60 may extend through the removable mold tool 118E, and a vacuum may be applied through the channels 60 to pull the polymeric sheet 58 against the grooves 80A during thermoforming. As shown in FIGS. 20 and 21, the nonuniform topography 68C of the bladder 64C formed using the removable mold tool 118E includes parallel horizontal ribs 82A corresponding with the grooves 80A of the mold surface 32E. The ribs 82A protrude at the side wall 73 of the bladder 64C and extend lengthwise in a direction extending from the front wall 84 of the bladder 64C to the rear wall 86 of the bladder 64C (e.g., the ribs 82A extend horizontally lengthwise along the side wall 73 of the bladder 64C).

Figure 22:
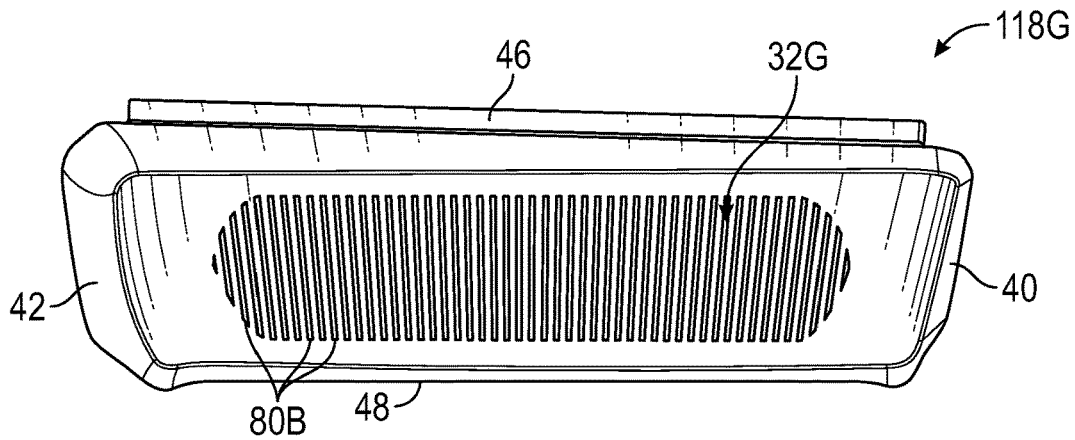
FIG. 22 is a side view of another removable mold tool that can be used in the mold assembly of FIG. 2 showing another mold surface with a nonuniform topography.
Figure 23:
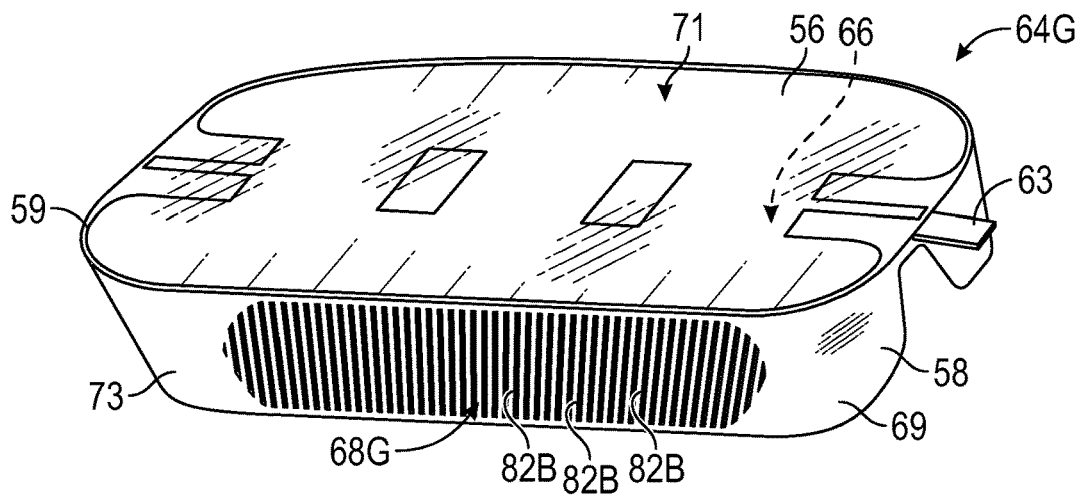
FIG. 23 is a perspective view of a bladder that was thermoformed in the mold assembly of FIG. 2 using the mold tool of FIG. 22.

FIG. 22 shows another alternate removable mold tool 118G that can be used in place of any of the mold tools 18A-18F or 118C-118F in the mold assembly 10. The topography of the mold surface 32G of the removable mold tool 118G includes parallel grooves 80B extending lengthwise in a direction from the top wall 46 of the removable mold tool 118G to the bottom wall 48 of the removable mold tool 118G. As shown in FIG. 23, the nonuniform topography 68G of the bladder 64G formed using the removable mold tool 118E includes parallel vertical ribs 82B corresponding with the grooves 80B of the mold surface 32G. The ribs 82B protrude at the side wall 73 of the bladder 64G and extend lengthwise in a direction extending from the top wall of the bladder 64G to the bottom wall of the bladder 64G (e.g., the ribs 82B extend vertically lengthwise along the side wall 73 of the bladder 64G).

The nonuniform topographies of the outer surfaces of the side walls of the various bladders shown and described herein may entail various structural and/or functional advantages in comparison to bladders having side walls with smoother outer surfaces (e.g., more uniform topologies). For example, the pyramidical shapes 70, the angled flat regions 76, and the ribs 82A and 82B may each impart a greater stiffness of the side wall 73 under dynamic compressive loading (e.g., compression of the top wall toward the bottom wall) due in part to a stack up of these features of the nonuniform topography. For example, the vertical ribs 82B of the bladder 64G of FIG. 23 may act as compression-limiting posts at the side wall 73, requiring greater force to compress the side wall 73 a given distance than if the side wall 73 were smooth (e.g., without a nonuniform topography or with a more uniform thickness). In contrast, the horizontal ribs 82A of the bladder 64C of FIGS. 20 and 21 may not interfere with an initial amount of compression under dynamic loading (e.g., compression of the top wall of the bladder 64C toward the bottom wall) at the side wall 73 until the ribs 82A stack upon one another, at which point they increase the resistance of the side wall 73 to vertical compression. Under lateral compression (e.g., inward forces on the front and rear walls 84, 86 of the bladder 64C), the side wall 73 having the horizontal ribs 82A will provide a greater resistance to compression than the side wall having the vertical ribs 82B. In some embodiments, ribs 82A or 82B of different sizes may be used at a medial side wall of a bladder than at a lateral side wall of the same bladder. For example, a tooling insert with thicker grooves 80A or 80B may be used at one side of a mold cavity 20 than at the opposite side of the mold cavity 20 so that the medial side wall of the resulting bladder will have a nonuniform topography with thicker ribs than the lateral side wall. When disposed in an article of footwear, the medial side wall may then provide greater compressive stiffness at the medial side of the article of footwear than at the lateral side.

Increased traction or grip may result from the nonuniform topologies of the sides wall 73. For example, the bladder 64A with the side wall 73 having the pyramidical shapes 70 may provide traction or grip, as may either of the sets of ribs 82A, 82B. Similarly, the bladder 64B with the side wall 73 having the outer surface 68B of flat regions 76 of irregular polygons may have a greater coefficient of friction than would a relatively smooth outer surface. A variety of nonuniform topologies can be created at the outer surfaces of the bladders using various removable mold tools in the modular mold assembly 10 to provide these or other functional features and advantages.

Figure 24:
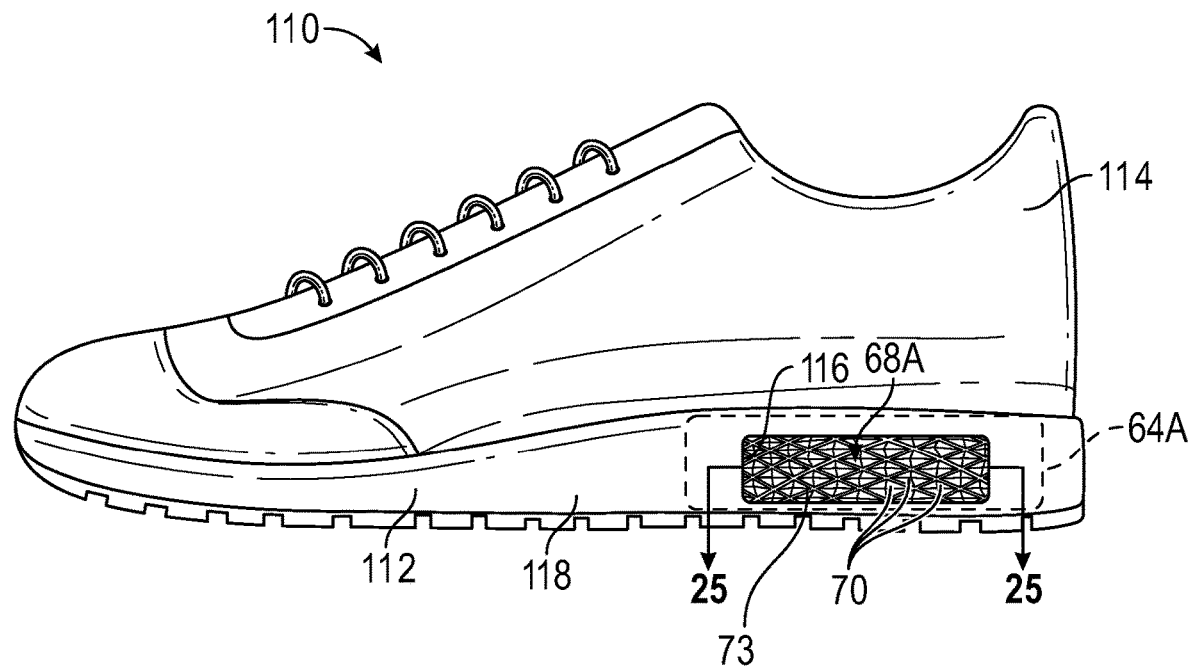
FIG. 24 is a medial side view of an article of footwear having a sole structure with the bladder of FIG. 12 disposed in the sole structure.

FIG. 24 shows an article of footwear 110 with a sole structure 112 and an upper 114 secured to the sole structure 112. The sole structure 112 defines an opening 116 in a side wall of a midsole 118. The bladder 64A is shown disposed within the midsole 118 at the opening 116 so that the nonuniform topography (e.g., the pyramidical shapes 70) of the outer surface 68A of the bladder 64A is aligned with the opening 116. The pyramidical shapes 70 are thus exposed at the opening 116, allowing their functional advantages to be accessed as well as allowing them to be viewed for aesthetic purposes. Stated differently, the outer surface 68A with the nonuniform topography is disposed at the opening 116 such that the nonuniform topography is viewable at an exterior of the article of footwear through the opening. The article of footwear 110 is just one example of a wearable article in which the bladder 64A may be incorporated. Bladders with outer surfaces having nonuniform topologies may be used in other wearable articles.

Figure 25:
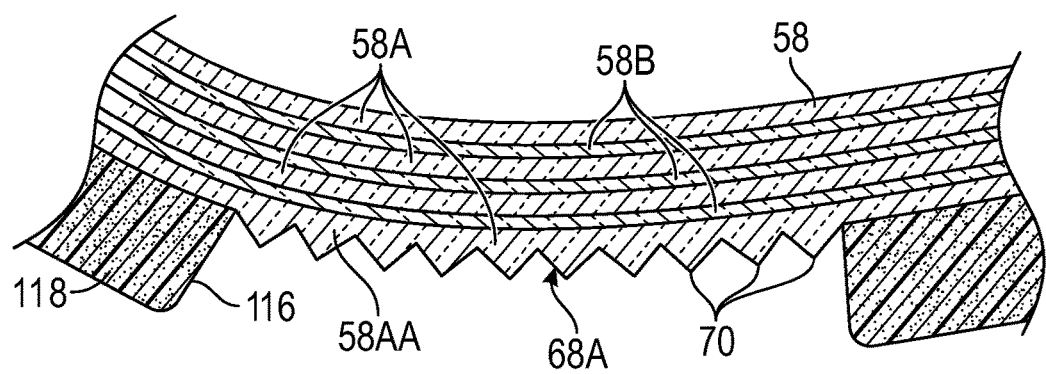
FIG. 25 is a fragmentary cross-sectional view of the sole structure of FIG. 24 taken at lines 25-25 in FIG. 24.

FIG. 25 shows that the second polymeric sheet 58 is a multi-layer sheet formed of thermoplastic polyurethane layers 58A alternating with barrier layers 58B of a copolymer of ethylene and vinyl alcohol (EVOH). As discussed with respect to FIG. 13, the outermost layer 58AA is thicker at the outer surface 68A with the nonuniform topography than at adjacent regions of the outermost layer 58AA.

Figure 26:
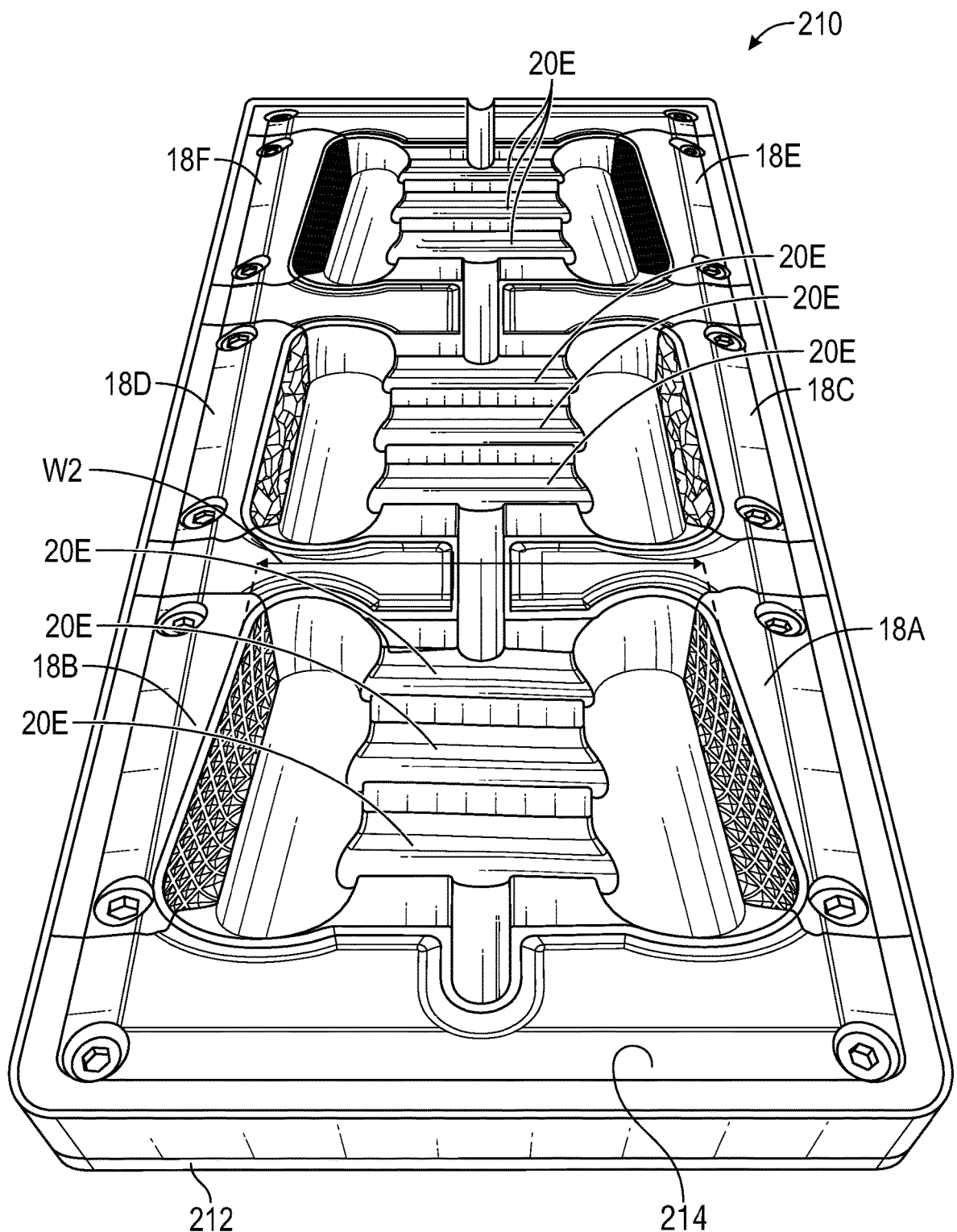
FIG. 26 is a perspective view of another modular mold assembly with larger mold cavities than the mold assembly of FIG. 2 and including some of the same removable mold tools of the mold assembly of FIG. 2.
Figure 27:
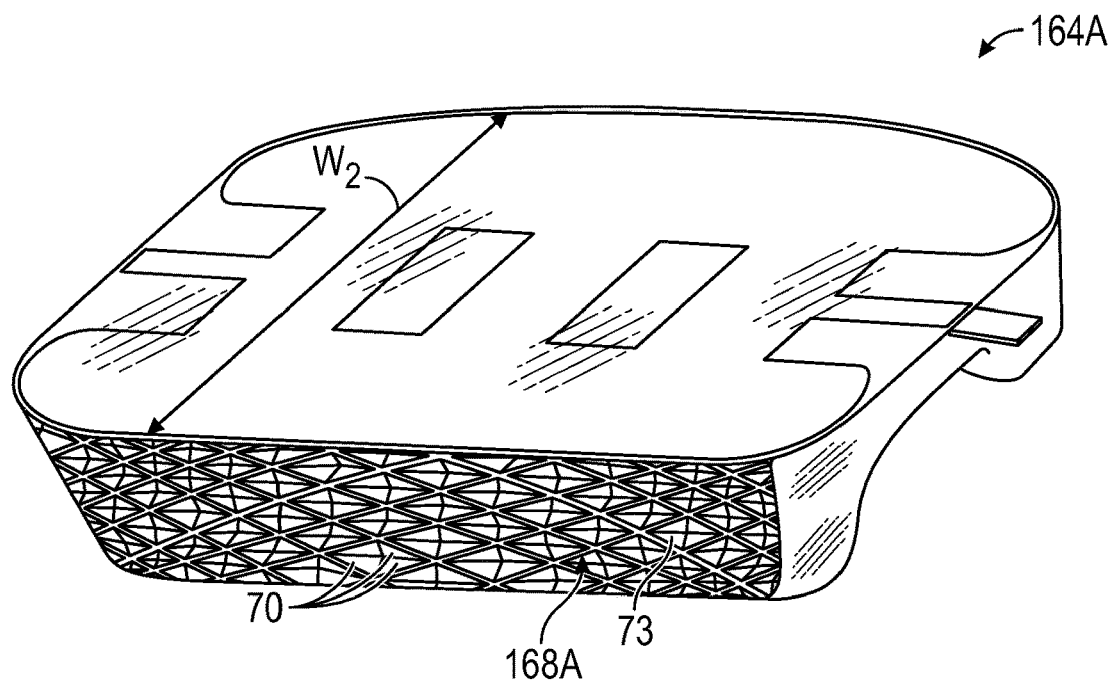
FIG. 27 is a perspective view of a bladder that was thermoformed in the mold assembly of FIG. 26.

FIG. 26 shows another embodiment of a modular mold assembly 210 that is alike in all aspects to mold assembly 10 except that the mold assembly 210 has a base 214 that is wider than the base 14 at the cross-passages 20E (e.g., width W2 is greater than width W1). The base 212 to which the base 214 and removable mold tools 18A-18F secure is also wider than the lower portion 12. Accordingly, the overall width W2 of a bladder 164A (see FIG. 27) formed using the modular mold assembly 210 will be greater than the overall width W1 (see FIGS. 1 and 12) of a bladder 64A formed using the mold assembly 10. Notably, the same removable mold tools 18A-18F and 118C-118F that secure to the base 14 may also secure to the base 214. Accordingly, the nonuniform topography of the outer surface 168A of the side wall 73 of the bladder 164A is the same as that of the side wall 73 of the bladder 64A. The removable mold tools 18A-18F and 118C-118F can thus be used in different modular mold assemblies to manufacture bladders of different sizes, such as different widths, such as may be needed for different sizes or widths of footwear.

Figure 28:
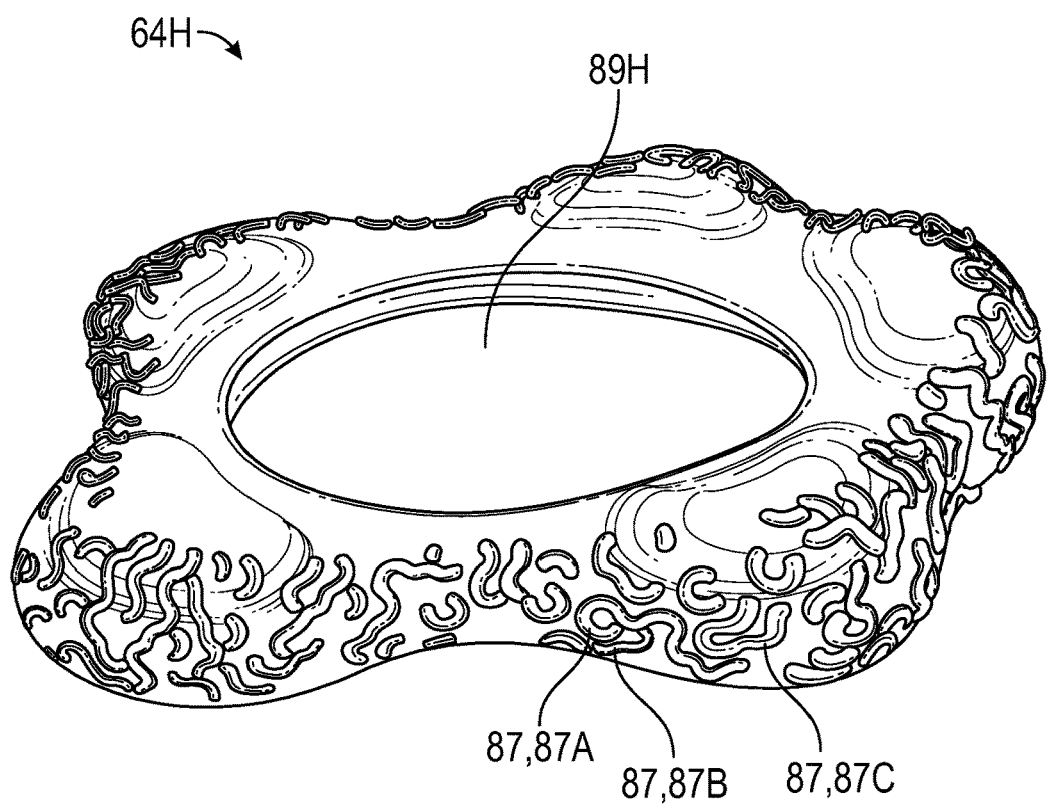
FIG. 28 is a perspective view of another embodiment of a bladder that was thermoformed in a modular mold assembly using removable mold tools to impart a nonuniform topography at the outer surface of the bladder.

FIG. 28 is a perspective view of another embodiment of a bladder 64H thermoformed in a modular mold assembly using removable mold tools to impart a nonuniform topography at the outer surface of the bladder. The modular mold assembly used to thermoform the bladder 64H is not shown but includes tooling inserts with curved recesses of varying lengths and shapes and disposed in a relatively random orientation relative to one another (e.g., not in rows, columns, or regular groupings). Such tooling inserts impart the nonuniform topography of curved, elongated protrusions 87 at the outer surface of the bladder 64H. Some of the curved, elongated protrusions 87 are individually identified as protrusions 87A, 87B, and 87C. The bladder 64H is annular as an uninflated portion of the first and second polymeric sheets extending at the middle of the bladder 64H is trimmed to leave a central aperture 89H.

Figure 29:
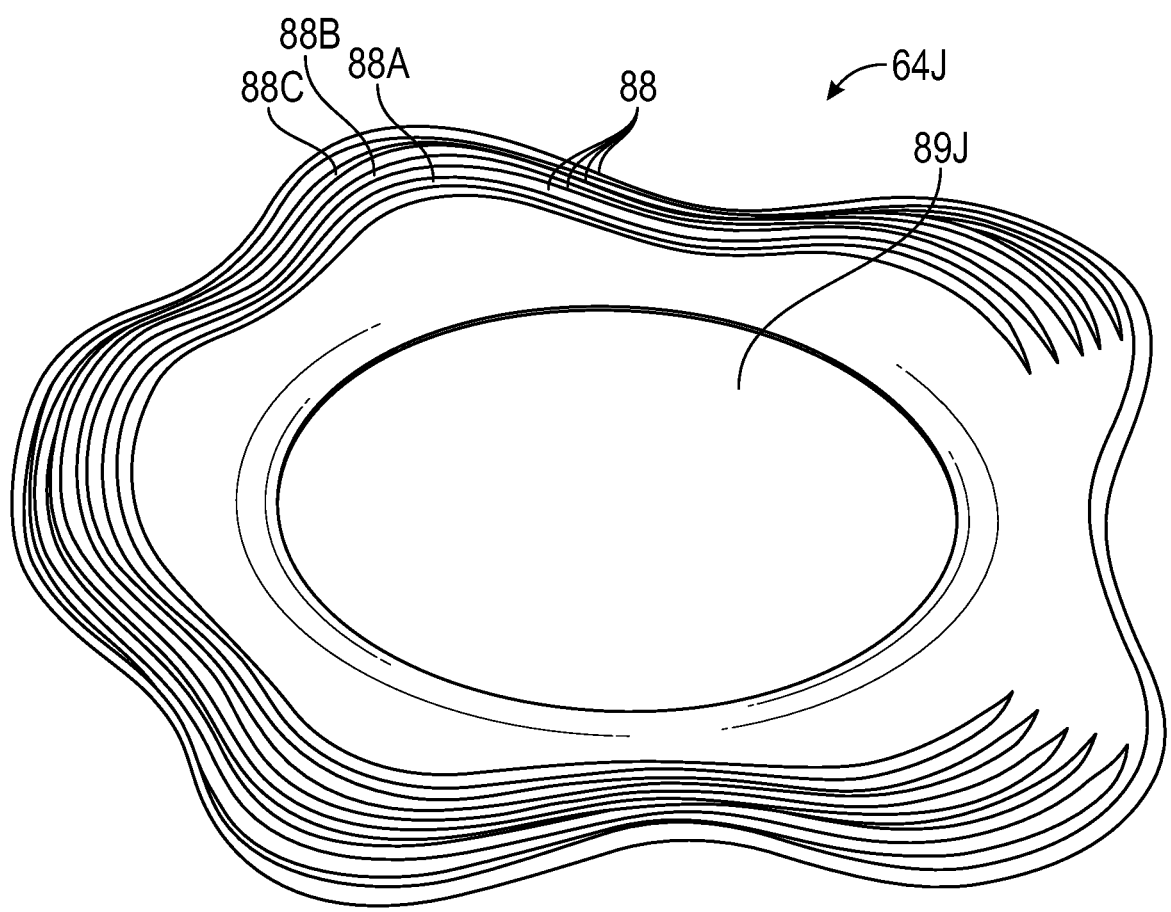
FIG. 29 is a perspective view of another embodiment of a bladder that was thermoformed in a modular mold assembly using removable mold tools to impart a nonuniform topography at the outer surface of the bladder.

FIG. 29 is a perspective view of another embodiment of a bladder 64J thermoformed in a modular mold assembly using removable mold tools to impart a nonuniform topography at the outer surface of the bladder. The modular mold assembly is not shown but includes tooling inserts with waved nonoverlapping protrusions extending almost entirely around the perimeter of the mold cavity of the modular mold assembly used to form the bladder 64J. Such tooling inserts impart the nonuniform topography of waved, nonoverlapping protrusions 88 extending around the side walls and one end of the bladder 64J at the outer surface of the bladder 64J. Some of the waved, elongated protrusions 88 are individually identified as protrusions 88A, 88B, and 88C. The bladder 64J is annular as an uninflated portion of the first and second polymeric sheets extending at the middle of the bladder 64J is trimmed to leave a central aperture 89J.

The following Table 1 shows the steps of one implementation of a method 300 of manufacturing a wearable article such as an article of footwear 110 using the modular mold assembly 10 or 210 described herein. The method 300 may begin with step 312 in which a modular mold assembly 10 or 210 with one or more removable mold tools 18A-18F is provided. The entity carrying out the method 300 may manufacture the mold assembly 10 or 210 or may obtain it from another entity. Next, in step 314, polymeric material (such as first and second polymeric sheets 56, 58) is disposed at the mold cavity 20A, 20B, 20C. In step 316, a vacuum may be applied to pull the polymeric material against the mold surface, such as the vacuum applied through the channels 60 to pull the polymeric sheet 58 against the mold surface 32A. In step 318, the first bladder, such as bladder 64A, is then thermoformed in the mold assembly 10 with the outer surface 68A having the nonuniform topography. The bladder 64A may then be inflated in step 320 and then sealed in step 322. The completed bladder 64A may then be disposed in a wearable article in step 324, such as an article of footwear 110 with the outer surface 68A aligned with an opening in the sole structure 112.

The removable mold tools allow flexibility in use of the modular mold assembly 10 or 210 to manufacture bladders with different nonuniform topologies. For example, in step 326, a first removable mold tool such as mold tool 18A may be removed, and in step 328 an alternate removable mold tool (e.g., a second removable mold tool) such as mold tool 18C may be inserted in its place in the mold assembly 10 or 210. Additional polymeric material, such as different polymeric sheets, referred to herein as third and fourth polymeric sheets (configured the same as first and second polymeric sheets 56, 58) may then be disposed at the mold cavity 20B in step 330, and then a second bladder 64B may be thermoformed in step 332, with the second bladder 64B having an outer surface 68B with a different nonuniform topography as described herein due to the use of the second removable mold tool.

In addition to using different mold inserts in the same mold assembly, the method 300 may include using a mold insert in different mold assemblies, such as to manufacture bladders of different sizes but using the same removable mold tools to impart the same nonuniform topologies. For example, the method 300 may include step 334, in which the first removable mold tool 18A (previously used in modular mold assembly 10) is inserted into a different modular mold assembly 210. Different polymeric material, such as additional polymeric sheets similar to polymeric sheets 56, 58, may then be disposed at the mold cavity of the modular mold assembly 210 in step 336. In step 338, another bladder with a different shape or volume, such as bladder 164A having a greater width and, due to the longer cross passages 20E, also a greater volume than bladder 64A. The bladder 164A has the same nonuniform topography (pyramidical shapes 70, which provide protrusions) at the outer surface 168A of the side wall 73 as the bladder 64A has at outer surface 68A of side wall 73.

TABLE 1

| Method 300 of Manufacturing a Wearable Article | |
| --- | --- |
| Step 312 | Provide modular mold assembly with removable mold tool(s) |
| Step 314 | Dispose polymeric material at mold cavity |
| Step 316 | Apply vacuum to pull polymeric material (e.g., polymeric sheet) against mold surface |
| Step 318 | Thermoform first bladder in mold assembly with outer surface having a nonuniform topography |
| Step 320 | Inflate bladder |
| Step 322 | Seal bladder |

TABLE 1-continued

Method 300 of Manufacturing a Wearable Article

| | |
|---|---|
| Step 324 | Dispose bladder in wearable article |
| Step 326 | Remove a first removable mold tool |
| Step 328 | Insert second removable mold tool |
| Step 330 | Dispose additional polymeric material at mold cavity |
| Step 332 | Thermoform second bladder in mold assembly with outer surface having a different nonuniform topography |
| Step 334 | Insert the first removable mold tool in an alternate modular mold assembly |
| Step 336 | Dispose different polymeric material at mold cavity |
| Step 338 | Thermoform another bladder with a different shape or volume and with the same nonuniform topography at the outer surface as the first bladder |

The following Clauses provide example configurations of a modular mold assembly, a method of manufacturing a wearable article, and a wearable article disclosed herein.

Clause 1: A modular mold assembly comprising: a base having a mold surface that partially defines a mold cavity for thermoforming a polymeric bladder with a fluid-filled chamber; wherein the base includes a side wall defining a first opening that opens into the mold cavity; a first removable mold tool that has an inner wall with a mold surface having a topography different than a topography of the mold surface of the base; wherein the first removable mold tool fits in the first opening in the side wall of the base with less than a predetermined clearance and with the mold surface of the first removable mold tool adjacent to the mold surface of the base and further defining the mold cavity; wherein the first removable mold tool includes an outer wall opposite the inner wall, a front wall, a rear wall opposite the front wall, a top wall, and a bottom wall opposite the top wall; wherein each of the front wall, the rear wall, the top wall, and the bottom wall extends from the outer wall to the mold surface; and wherein the rear wall is wider than the front wall and the bottom wall is wider than the top wall.

Clause 2: The modular mold assembly of Clause 1, wherein the first removable mold tool defines channels extending through the first removable mold tool to the mold surface of the first removable mold tool.

Clause 3: The modular mold assembly of Clause 2, wherein the base defines at least one conduit in fluid communication with the channels of the first removable mold tool.

Clause 4: The modular mold assembly of any of Clauses 1-3, wherein the front wall has a surface area less than a surface area of the rear wall.

Clause 5: The modular mold assembly of any of Clauses 1-4, wherein the top wall has a surface area less than a surface area of the bottom wall.

Clause 6: The modular mold assembly of any of Clauses 1-5, wherein a projected surface area of the top wall projected onto a plane extending through the first removable mold tool between the top wall and the bottom wall is less than a projected surface area of the bottom wall projected onto the plane.

Clause 7: The modular mold assembly of any of Clauses 1-6, wherein a projected surface area of the front wall projected onto a plane extending through the first removable mold tool between the front wall and the rear wall is less than a projected surface area of the rear wall projected onto the plane.

Clause 8: The modular mold assembly of any of Clauses 1-7, wherein the mold surface of the first removable mold tool is concave in a direction from the front wall to the rear wall and concave in a direction from the top wall to the bottom wall.

Clause 9: The modular mold assembly of any of Clauses 1-8, wherein at least one of the front wall or the rear wall is non-planar.

Clause 10: The modular mold assembly of any of Clauses 1-9, wherein at least a portion of the front wall is convex and at least a portion of the rear wall is convex.

Clause 11: The modular mold assembly of any of Clauses 1-10, wherein a length of the outer wall is greater than a length of the inner wall.

Clause 12: The modular mold assembly of any of Clauses 1-11, wherein the outer wall of the first removable mold tool is flush with the side wall of the base when the first removable mold tool is in the first opening of the side wall of the base.

Clause 13: The modular mold assembly of any of Clauses 1-12, wherein the side wall of the base is a first side wall and the base further includes a second side wall opposite from the first side wall, the second side wall defining a second opening that opens into the mold cavity; the modular mold assembly further comprising: a second removable mold tool that has an inner wall with a mold surface having a topography different than a topography of the mold surface of the base; wherein the second removable mold tool fits lengthwise in the second opening with the mold surface of the second removable mold tool adjacent to the mold surface of the base and further defining the mold cavity; wherein the second removable mold tool includes an outer wall opposite the inner wall, a front wall, a rear wall opposite the front wall, a top wall, and a bottom wall opposite the top wall; wherein each of the front wall, the rear wall, the top wall, and the bottom wall of the second removable mold tool extends from the outer wall to the mold surface; and wherein the rear wall of the second removable mold tool is wider than the front wall of the second removable mold tool and the bottom wall of the second removable mold tool is wider than the top wall of the second removable mold tool.

Clause 14: The modular mold assembly of Clause 13, wherein the top wall, the bottom wall, the front wall, and the rear wall of the second removable mold tool are mirror images in shape and dimension of the top wall, the bottom wall, the front wall, and the rear wall, respectively, of the first removable mold tool.

Clause 15: The modular mold assembly of any of Clauses 13-14, wherein the topology of the first removable mold tool is a nonuniform topology; and wherein the mold surface of the second removable mold tool has a nonuniform topography different from the nonuniform topography of the first removable mold tool.

Clause 16: The modular mold assembly of any of Clauses 13-15, wherein the mold surface of the first removable mold tool imparts a nonuniform topography to a first outer side wall of a bladder thermoformed in the modular mold assembly, and the mold surface of the second removable mold tool imparts a nonuniform topography to a second outer side wall of the bladder.

Clause 17: A method of manufacturing a wearable article, the method comprising: providing a modular mold assembly that defines a mold cavity, the modular mold assembly including a base and a first removable mold tool that interfits with the base; wherein the base has a mold surface partially defining the mold cavity and the first removable mold tool has a mold surface disposed at and further defining the mold cavity of the modular mold assembly; wherein a topography of the mold surface of the first removable mold tool is different than a topography of the mold surface of the base; disposing polymeric material at the mold cavity; and thermoforming a bladder in the mold cavity from the polymeric material, the bladder having an outer surface with a nonuniform topography imparted by the topography of the mold surface of the first removable mold tool.

Clause 18: The method of Clause 17, further comprising: removing the first removable mold tool from the modular mold assembly; inserting a second removable mold tool into the modular mold assembly, the second removable mold tool including a different mold surface disposed at and partially defining the mold cavity of the modular mold assembly; wherein a topography of the mold surface of the second removable mold tool is different than the topography of the mold surface of the first removable mold tool; disposing additional polymeric material at the mold cavity; and thermoforming the additional polymeric material in the mold cavity into a different bladder having a wall with an outer surface with a nonuniform topography imparted by the topography of the mold surface of the second removable mold tool and configured differently than the nonuniform topography of the bladder thermoformed using the first removable mold tool.

Clause 19: The method of any of Clauses 17-18, further comprising: removing the first removable mold tool from the modular mold assembly; inserting the first removable mold tool into an alternate modular mold assembly so that the mold surface of the first removable mold tool is disposed at and partially defines an alternate mold cavity of the alternate modular mold assembly, the alternate mold cavity having a different shape or volume than the mold cavity of the modular mold assembly; disposing additional polymeric material at the alternate modular mold cavity; and thermoforming the additional polymeric material in the alternate mold cavity into a different bladder having the different shape or volume of the alternate mold cavity and having a wall with an outer surface having the nonuniform topography imparted by the topography of the mold surface of the first removable mold tool.

Clause 20: The method of Clause 17, wherein the first removable mold tool defines channels extending through the first removable mold tool to the mold surface; and the method further comprising: applying a vacuum to the mold cavity through the channels to pull the polymeric material against the mold surface.

Clause 21: The method of Clause 17, wherein the topography of the mold surface of the first removable mold tool includes pyramidical cavities and the nonuniform topography of the outer surface of the bladder includes pyramidical shapes corresponding with the pyramidical cavities of the mold surface of the first removable mold tool, the pyramidical shapes having peaks extending outward from the bladder.

Clause 22: The method of Clause 17, wherein the topography of the mold surface of the first removable mold tool includes grooves and the nonuniform topography of the outer surface of the bladder includes ribs corresponding with the grooves of the mold surface of the first removable mold tool.

Clause 23: The method of Clause 22, wherein the nonuniform topography of the bladder is at a side wall of the bladder and the ribs extend lengthwise in a direction from a front wall of the bladder to a rear wall of the bladder.

Clause 24: The method of Clause 22, wherein the nonuniform topography of the bladder is at a side wall of the bladder and the ribs extend vertically in a direction from a top wall of the bladder to a bottom wall of the bladder.

Clause 25: The method of any of Clauses 22-24, wherein the ribs are parallel.

Clause 26: The method of Clause 17, wherein: the mold surface includes a plurality of flat regions defining irregular polygons; and at least some of the flat regions are angled relative to one another.

Clause 27: The method of Clause 17, further comprising: inflating the bladder; and sealing the bladder.

Clause 28: The method of Clause 17, further comprising: disposing the bladder within a sole structure of an article of footwear at an opening defined by the sole structure so that the nonuniform topography of the outer surface of the bladder is aligned with the opening.

Clause 29: A wearable article comprising: a bladder including polymeric material enclosing a sealed, fluid-filled interior cavity; and the bladder having a side with an outer surface having a nonuniform topography.

Clause 30: The wearable article of Clause 29, wherein: the nonuniform topography includes pyramidical shapes having peaks extending outward from the bladder.

Clause 31: The wearable article of Clause 29, wherein the nonuniform topography includes ribs extending lengthwise in a direction from a front wall of the bladder to a rear wall of the bladder.

Clause 32: The wearable article of Clause 29, wherein the nonuniform topography includes ribs extending vertically in a direction from a top wall of the bladder to a bottom wall of the bladder.

Clause 33: The wearable article of Clause 29, wherein: the outer surface of the side of the bladder includes a plurality of flat regions defining irregular polygons; and at least some flat regions of the plurality of the flat regions are angled relative to one another.

Clause 34: The wearable article of Clause 29, wherein: the wearable article is an article of footwear; and the nonuniform topography of the bladder is disposed at a side of a sole structure of the article of footwear.

Clause 35: The wearable article of Clause 34, wherein the sole structure includes an opening and the outer surface of the side of the bladder with the nonuniform topography is disposed at the opening such that the nonuniform topography is viewable at an exterior of the article of footwear through the opening.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. As used in the description and the accompanying claims, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of a shoe extends between a forefoot region and a heel region of the shoe. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of a shoe extends between a lateral side and a medial side of the shoe. The transverse direction or axis may also be referred to as a lateral direction or axis or a mediolateral direction or axis.

The term "vertical" refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" or "upwards" refers to the vertical direction pointing towards a top of the component, which may include an instep, a fastening region, and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the shoe is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the shoe in an assembled shoe. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A modular mold assembly for thermoforming a polymeric sheet material into a bladder with a fluid-filled chamber, the modular mold assembly comprising:
   a base having a mold surface that partially defines a mold cavity for thermoforming the polymeric sheet material into the bladder with the fluid-filled chamber; wherein the base includes a side wall defining a first opening that opens into the mold cavity; and
   a first removable mold tool that has an inner wall with a mold surface having a topography different than a topography of the mold surface of the base; wherein the first removable mold tool fits in the first opening in the side wall of the base with less than a predetermined clearance and with the mold surface of the first removable mold tool adjacent to the mold surface of the base and further defining the mold cavity; wherein the first removable mold tool includes an outer wall opposite the inner wall, a front wall, a rear wall opposite the front wall, a top wall, and a bottom wall opposite the top wall; wherein each of the front wall, the rear wall, the top wall, and the bottom wall extends from the outer wall to the mold surface; and wherein the rear wall is wider than the front wall and the bottom wall is wider than the top wall so that the first removable mold tool fits in the first opening in the side wall of the base in only one orientation.

2. The modular mold assembly of claim 1, wherein the first removable mold tool defines channels extending through the first removable mold tool to the mold surface of the first removable mold tool.

3. The modular mold assembly of claim 2, wherein the base defines at least one conduit in fluid communication with the channels of the first removable mold tool.

4. The modular mold assembly of claim 1, wherein the front wall has a surface area less than a surface area of the rear wall; and
wherein the top wall has a surface area less than a surface area of the bottom wall.

5. The modular mold assembly of claim 1, wherein a projected surface area of the top wall projected onto a plane extending through the first removable mold tool between the top wall and the bottom wall is less than a projected surface area of the bottom wall projected onto the plane.

6. The modular mold assembly of claim 1, wherein a projected surface area of the front wall projected onto a plane extending through the first removable mold tool between the front wall and the rear wall is less than a projected surface area of the rear wall projected onto the plane.

7. The modular mold assembly of claim 1, wherein the mold surface of the first removable mold tool is concave in a direction from the front wall to the rear wall and concave in a direction from the top wall to the bottom wall.

8. The modular mold assembly of claim 1, wherein at least one of the front wall or the rear wall is non-planar.

9. The modular mold assembly of claim 1, wherein at least a portion of the front wall is convex and at least a portion of the rear wall is convex.

10. The modular mold assembly of claim 1, wherein a length of the outer wall is greater than a length of the inner wall.

11. The modular mold assembly of claim 1, wherein the outer wall of the first removable mold tool is flush with the side wall of the base when the first removable mold tool is in the first opening of the side wall of the base.

12. The modular mold assembly of claim 1, wherein the side wall of the base is a first side wall and the base further includes a second side wall opposite from the first side wall, the second side wall defining a second opening that opens into the mold cavity; the modular mold assembly further comprising:
a second removable mold tool that has an inner wall with a mold surface having a topography different than a topography of the mold surface of the base; wherein the second removable mold tool fits lengthwise in the second opening with the mold surface of the second removable mold tool adjacent to the mold surface of the base and further defining the mold cavity; wherein the second removable mold tool includes an outer wall opposite the inner wall, a front wall, a rear wall opposite the front wall, a top wall, and a bottom wall opposite the top wall; wherein each of the front wall, the rear wall, the top wall, and the bottom wall of the second removable mold tool extends from the outer wall to the mold surface; and wherein the rear wall of the second removable mold tool is wider than the front wall of the second removable mold tool and the bottom wall of the second removable mold tool is wider than the top wall of the second removable mold tool.

13. The modular mold assembly of claim 12, wherein the top wall, the bottom wall, the front wall, and the rear wall of the second removable mold tool are mirror images in shape and dimension of the top wall, the bottom wall, the front wall, and the rear wall, respectively, of the first removable mold tool.

14. The modular mold assembly of claim 12, wherein the topography of the first removable mold tool is a nonuniform topography; and wherein the mold surface of the second removable mold tool has a nonuniform topography different from the nonuniform topography of the first removable mold tool.

15. The modular mold assembly of claim 12, wherein the mold surface of the first removable mold tool imparts a nonuniform topography to a first outer side wall of a bladder thermoformed in the modular mold assembly, and the mold surface of the second removable mold tool imparts a nonuniform topography to a second outer side wall of the bladder.

16. A method of manufacturing a wearable article, the method comprising:
providing a modular mold assembly that defines a mold cavity, the modular mold assembly including a base and a first removable mold tool that interfits with the base; wherein the base has a mold surface partially defining the mold cavity and the first removable mold tool has a mold surface disposed at and further defining the mold cavity of the modular mold assembly; wherein a topography of the mold surface of the first removable mold tool is different than a topography of the mold surface of the base;
disposing polymeric material at the mold cavity, the polymeric material including a first polymeric sheet and a second polymeric sheet, wherein the second polymeric sheet is thicker than the first polymeric sheet and is disposed between the first polymeric sheet and the mold surface of the first removable mold tool; and
thermoforming a bladder in the mold cavity from the polymeric material, the bladder having an outer surface with a nonuniform topography imparted by the topography of the mold surface of the first removable mold tool onto the second polymeric sheet.

17. The method of claim 16, further comprising:
removing the first removable mold tool from the modular mold assembly;
inserting a second removable mold tool into the modular mold assembly, the second removable mold tool including a different mold surface disposed at and partially defining the mold cavity of the modular mold assembly; wherein a topography of the mold surface of the second removable mold tool is different than the topography of the mold surface of the first removable mold tool;
disposing additional polymeric material at the mold cavity, the additional polymeric material including a third polymeric sheet and a fourth polymeric sheet, the fourth polymeric sheet disposed between the third polymeric sheet and the mold surface of the second removable mold tool; and thermoforming the additional polymeric material in the mold cavity into a different bladder having a wall with an outer surface with a nonuniform topography imparted by the topography of the mold surface of the second removable mold tool and configured differently than the nonuniform topography of the bladder thermoformed using the first removable mold tool.

18. The method of claim 16, further comprising:
removing the first removable mold tool from the modular mold assembly;
inserting the first removable mold tool into an alternate modular mold assembly so that the mold surface of the first removable mold tool is disposed at and partially defines an alternate mold cavity of the alternate modular mold assembly, the alternate mold cavity having a different shape or volume than the mold cavity of the modular mold assembly;
disposing additional polymeric material at the alternate mold cavity, the additional polymeric material including a third polymeric sheet and a fourth polymeric sheet, the fourth polymeric sheet disposed between the third polymeric sheet and the mold surface of the first removable mold tool; and
thermoforming the additional polymeric material in the alternate mold cavity into a different bladder having the different shape or volume of the alternate mold cavity and having a wall with an outer surface having the nonuniform topography imparted by the topography of the mold surface of the first removable mold tool.

19. The method of claim 16, wherein the first removable mold tool defines channels extending through the first removable mold tool to the mold surface; and the method further comprising:
applying a vacuum to the mold cavity through the channels to pull the second polymeric sheet against the mold surface.

20. The modular mold assembly of claim 12, wherein the modular mold assembly is a first modular mold assembly; and in combination with an alternate modular mold assembly having an alternate base wider than the base of the modular mold assembly, the alternate base having a mold surface that partially defines an alternate mold cavity having a different shape or volume than the mold cavity of the modular mold assembly for thermoforming a different polymeric bladder with a fluid-filled chamber and having the different shape or volume of the alternate mold cavity; wherein the alternate base includes a first side wall defining a first opening that opens into the alternate mold cavity and a second side wall opposite from the first side wall, the second side wall defining a second opening that opens into the alternate mold cavity;
wherein the first removable mold tool fits in the first opening in the first side wall of the alternate base with the mold surface of the first removable mold tool adjacent to the mold surface of the alternate base and further defining the alternate mold cavity; and
wherein the second removable mold tool fits in the second opening in the second side wall of the alternate base with the mold surface of the second removable mold tool adjacent to the mold surface of the alternate base and further defining the alternate mold cavity.

* * * * *